(12) United States Patent
Hirai et al.

(10) Patent No.: US 7,597,945 B2
(45) Date of Patent: Oct. 6, 2009

(54) POLYMERIZABLE LIQUID CRYSTAL COMPOSITION CONTAINING FLUORINE-SUBSTITUTED (METH) ACRYLATE DERIVATIVES

(75) Inventors: Yoshiharu Hirai, Ichihara (JP); Takashi Kato, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 167 days.

(21) Appl. No.: 11/269,820

(22) Filed: Nov. 9, 2005

(65) Prior Publication Data
US 2006/0134350 A1 Jun. 22, 2006

(30) Foreign Application Priority Data
Nov. 9, 2004 (JP) ............................. 2004-324689

(51) Int. Cl.
C09K 19/10 (2006.01)
(52) U.S. Cl. ................. 428/1.33; 428/1.54; 252/299.01
(58) Field of Classification Search ................. 428/1.3, 428/1.52, 1.31, 1.33, 1.54; 252/299.01
See application file for complete search history.

(56) References Cited

U.S. PATENT DOCUMENTS 3,551,375 A * 12/1970 Dumoulin et al. ........... 524/315

(Continued)

FOREIGN PATENT DOCUMENTS

GB 2 324 382 10/1998

(Continued)

OTHER PUBLICATIONS

English Abstract of JP 10319408, published Dec. 4, 1998.
Primary Examiner—David R Sample
Assistant Examiner—Sohpie Hon
(74) Attorney, Agent, or Firm—Wenderoth, Lind & Ponack, L.L.P.

(57) ABSTRACT

The present invention relates to a polymer satisfying at least two characteristics among the characteristics such that it has orientation of homeotropic and so forth; it has an orientation having no (or less) defects; it has a large optical anisotropy; it is tightly adhered to a supporting plate; it has a sufficient hardness; it is colorless and transparent; it has a large heat resistance; it has a large weatherability; and so forth and to a composition which is the precursor. The composition contains the following the compound (1), (2) and (3).

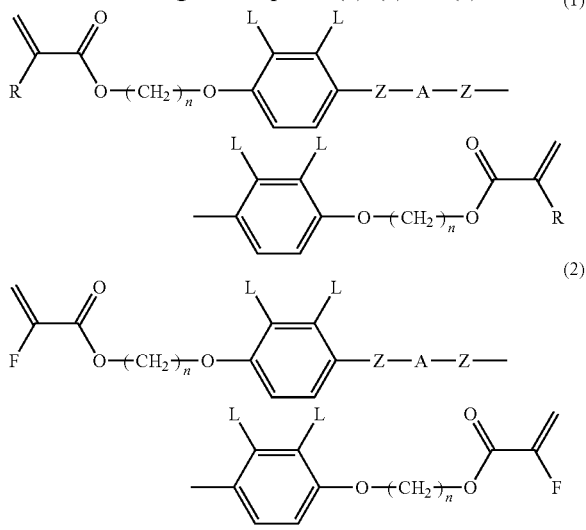

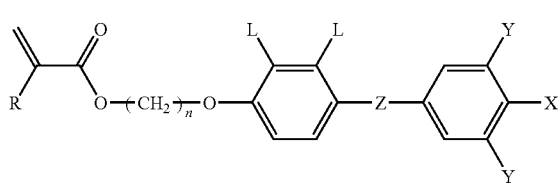

In the above formulas, R is hydrogen or methyl, L is hydrogen, fluorine and so forth, A is 1,4-phenylene and so forth, X is trifluoromethyl and so forth, Y is hydrogen or fluorine, Z is —COO— and so forth, and n is an integer of 1 to 10.

20 Claims, 1 Drawing Sheet

U.S. PATENT DOCUMENTS

| | | |
|---|---|---|
| 2004/0263736 A1 | 12/2004 | Graham et al. |
| 5,863,457 A * | 1/1999 | Hasebe et al. .......... 252/299.01 |
| 5,894,050 A * | 4/1999 | Camps et al. ............... 428/429 |
| 6,051,288 A * | 4/2000 | Kondo et al. ................. 428/1.3 |
| 6,749,771 B1 * | 6/2004 | Cherkaoui et al. ..... 252/299.01 |
| 7,070,838 B2 * | 7/2006 | Sasada et al. ................ 428/1.1 |
| 7,157,124 B2 * | 1/2007 | Sasada et al. ................ 428/1.1 |
| 7,235,283 B2 * | 6/2007 | Adachi et al. ................ 428/1.3 |
| 7,250,116 B2 * | 7/2007 | Nishikawa et al. ..... 252/299.01 |
| 2003/0012935 A1 * | 1/2003 | Kuntz et al. ................. 428/209 |

FOREIGN PATENT DOCUMENTS

| | | |
|---|---|---|
| JP | 2002-243942 | 8/2002 |
| JP | 2004-198478 | 7/2004 |
| JP | 2005113131 A * | 4/2005 |
| WO | 99/45082 | 9/1999 |
| WO | 02/44801 | 6/2002 |

* cited by examiner

[Fig. 1]
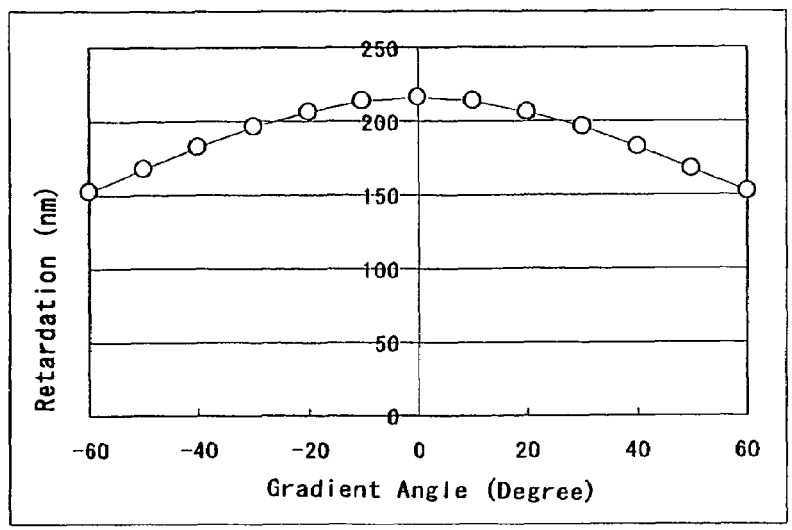
[Fig 2]
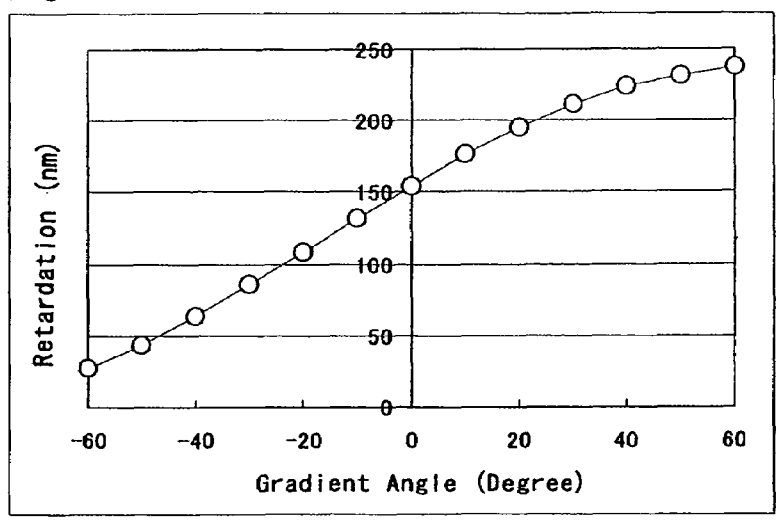
[Fig. 3]
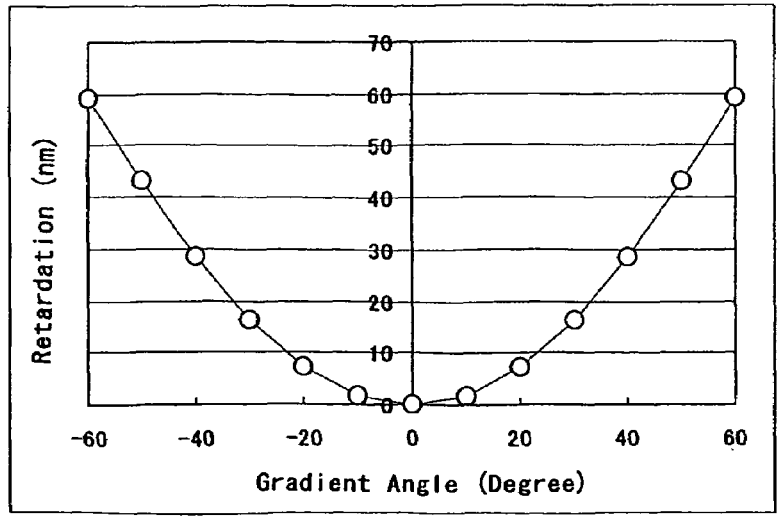

POLYMERIZABLE LIQUID CRYSTAL COMPOSITION CONTAINING FLUORINE-SUBSTITUTED (METH) ACRYLATE DERIVATIVES

FIELD OF THE INVENTION

The present invention relates to a composition containing a fluorine-substituted (meth)acrylate derivative which is a polymerizable liquid crystal compound, and a polymer obtained from the composition, and uses of the polymer as an optical compensating film and so forth.

BACKGROUND OF THE INVENTION

A polymerizable compound having a liquid crystal phase provides polymers having functions such as optical compensation by polymerization. This is because an orientation of liquid crystal molecules is fixed by polymerization. Various polymerizable compounds are developed in order to utilize such function of the polymers. However, only one polymerizable compound may not fulfill satisfactory functions. Then, it has been tried to prepare a composition from several polymerizable compounds and polymerize this composition.

Patent document 1: JP H10-319408 A/1998 (GB 2324382 A).

Patent document 2: JP 2004-198478 A/2004.

Patent document 3: JP 2002-243942 A/2002.

SUMMARY OF THE INVENTION

The present invention includes a composition containing a compound represented by the following formula, a polymer obtained by polymerizing the composition and uses thereof.

A composition containing at least one compound represented by Formula (1) as a first component, at least one compound represented by Formula (2) as a second component and at least one compound represented by Formula (3) as a third component:

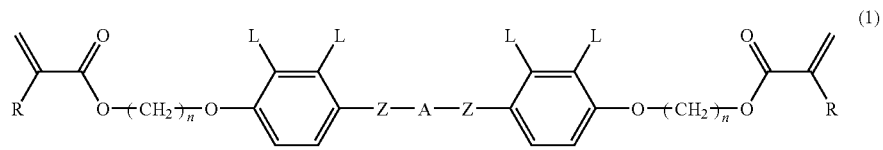

(1)

in Formula (1), R is hydrogen or methyl; L is hydrogen, fluorine, chlorine, methyl, trifluoromethyl or cyano; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —$CH_2CH_2$COO—, —OCO$CH_2CH_2$—, —CH=CHCOO—, —OCOCH=CH—, —$CH_2CH_2$—, —C≡C—, —$CH_2$O— or —O$CH_2$—; and n is an integer of 1 to 10;

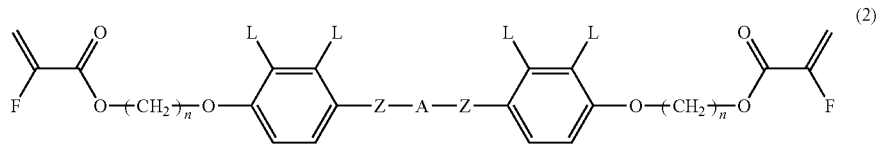

(2)

in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —$CH_2CH_2$COO—, —OCO$CH_2CH_2$—, —CH=CHCOO—, —OCOCH=CH—, —$CH_2CH_2$—, —C≡C—, —$CH_2$O— or —O$CH_2$—; and n is an integer of 1 to 10;

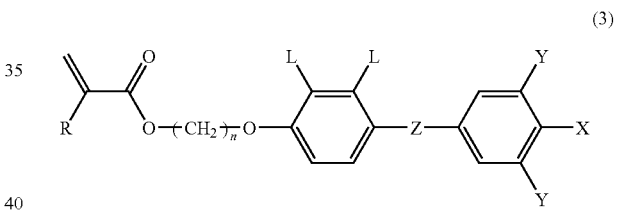

(3)

in Formula (3), R is hydrogen or methyl; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —$CH_2CH_2$COO—, —OCO$CH_2CH_2$—, —CH=CHCOO—, —OCOCH=CH—, —$CH_2CH_2$—, —C≡C—, —$CH_2$O— or —O$CH_2$—; and n is an integer of 1 to 10.

DETAILED DESCRIPTION OF THE INVENTION

Terms in the present specification are used in the following manners. A liquid crystal compound is a general term for compounds having a liquid crystal phase and compounds which do not have a liquid crystal phase but are useful as components for liquid crystal compositions. A liquid crystal phase includes a nematic phase, a smectic phase, a cholesteric phase and so forth and it means a nematic phase in many cases. Polymerizability means ability in which monomers are polymerized by means such as light, heat, catalysts and so forth to provide polymers. At least one compound represented by Formula (1) shall be represented as a compound (1). The same shall apply to at least one compound represented by Formula (2). A code L was used in both of Formulas (1) and (2). The meaning of two codes L may be the same or different each other. For example, there is a case in which L in Formula (1) and Formula (2) is hydrogen. There is a case in which L in Formula (1) is hydrogen and L in Formula (2) is fluorine. In Formula (1), four codes L were used. The meaning of all these codes may be the same or different each other. Such rule shall be applied to the meanings of the other codes. (Meth)acrylate represents one or both of acrylate and methacrylate. The ratio (%) of the compound (1), the compound (2) or the compound (3) which is a component of the composition is % by weight (wt %) calculated based on the whole weight of these three polymerizable compounds. The added amount (%) of the other component in the composition is % by weight (wt %) calculated based on the whole weight of the compounds (1), (2) and (3).

Orientation in a liquid crystal molecule is classified into homogeneous (parallel), homeotropic (vertical), tilted twisted and so forth based on a size of a tilt angle and so forth. The tilt angle is an angle between a director (an orientational vector) of a liquid crystal molecule and a supporting plate. The homogeneous means a state in which the director is parallel to the plate and lines up in the same direction. The examples of the tilt angle are 0 degree to 5 degrees. The homeotropic means a state in which the director is vertical to the plate. The examples of the tilt angle are 85 degrees to 90 degrees. The tilted means that the director is standing up from a parallel state to a vertical state as the director becomes apart from the plate. The examples of the tilt angle are 5 degrees to 85 degrees. The twisted means a state in which the directors are parallel to the plate and twisted like a staircase centering a screw axis. The examples of the tilt angle are 0 degree to 5 degrees.

The advantage of the present invention is a composition satisfying at least two characteristics among the characteristics such that it has a liquid crystal phase such as a nematic phase and so forth; it has a broad temperature range of a liquid crystal phase; it has an orientation of homogeneous, tilted, homeotropic, twisted and so forth; it has an even orientation; its orientation can be selected; it is liable to be polymerized; it is chemically stable; it is colorless; and so forth. One aspect is a composition having a suitable valance regarding these characteristics. Another aspect is a polymer obtained from such composition. Another aspect is a polymer satisfying at least two characteristics among the characteristics such that it has orientation of homogeneous, tilted, homeotropic, twisted and so forth; it has an orientation having no (or less) defects; it has a large optical anisotropy; it is tightly adhered to a supporting plate; it has a sufficient hardness; it is colorless and transparent; it has a large heat resistance; it has a large weatherability; and so forth.

The present invention shall be described in the following items.

Item 1. A composition containing at least one compound represented by Formula (1) as a first component, at least one compound represented by Formula (2) as a second component and at least one compound represented by Formula (3) as a third component:

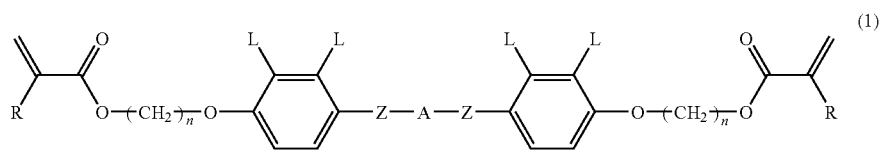

(1)

in Formula (1), R is hydrogen or methyl; L is hydrogen, fluorine, chlorine, methyl, trifluoromethyl or cyano; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH=CHCOO—, —OCOCH=CH—, —CH$_2$CH$_2$—, —C≡C—, —CH$_2$O— or —OCH$_2$—; and n is an integer of 1 to 10.

Formula (1) is symmetrical in right and left. However, the individual compounds represented by this formula may be asymmetrical in right and left. The examples of the asymmetric compound is the compound in which R at a left side is hydrogen and R at a right side is methyl; two L's at a left side are hydrogen and two L's at a right side are hydrogen and fluorine; Z at a left side is —COO— and Z at a right side is —OCO—; n at a left side is 6 and n at a right side is 8.

Preferred R is hydrogen, and preferred L is hydrogen or fluorine. More preferred R is hydrogen. Preferred A is 1,4-phenylene, 2-methyl-1,4-phenylene, 2-trifluoromethyl-1,4-phenylene, 2,3-bis(trifluoromethyl)-1,4-phenylene, 9-methylfluorene-2,7-diyl or 9,9-dimethylfluorene-2,7-diyl. Further preferred A is 9-methylfluorene-2,7-diyl. Preferred Z is —COO—, —OCO—, —CH$_2$CH$_2$COO—, —OCOCH$_2$CH$_2$—, —CH=CHCOO— or —OCOCH=CH—. More preferred Z is —COO— or —OCO—. The bonding group Z is bonded to the ring A. The ring A is preferably bonded to oxygen of —COO— rather than carbon of —COO—. Preferred n is 2, 4, 6 or 8. Further preferred n is 6.

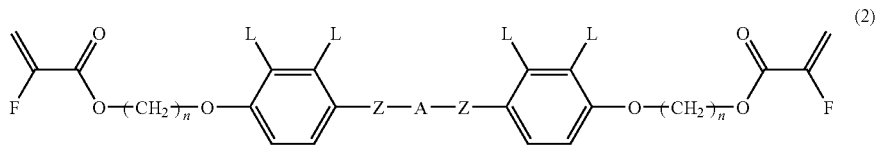

in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH═CHCOO—, —OCOCH═CH—, —CH$_2$CH$_2$—, —C≡C—, —CH$_2$O— or —OCH$_2$—; and n is an integer of 1 to 10.

Formula (2) is symmetrical in right and left. However, the individual compounds represented by this formula may be asymmetrical in right and left. Preferred L is hydrogen. Preferred A is 1,4-phenylene, 2,3-difluoro-1,4-phenylene, 2-methyl-1,4-phenylene, 2,3-bis(trifluoromethyl)-1,4-phenylene, 9-methylfluorene-2,7-diyl or 9,9-dimethylfluorene-2,7-diyl. Preferred Z is —COO—, —OCO—, —CH$_2$CH$_2$COO—, —OCOCH$_2$CH$_2$—, —CH═CHCOO— or —OCOCH═CH—. More preferred Z is —COO— or —OCO—. The bonding group Z is bonded to the ring A. The ring A is preferably bonded to oxygen of —COO— rather than carbon of —COO—. Preferred n is 2, 4, 6 or 8. More preferred n is 6.

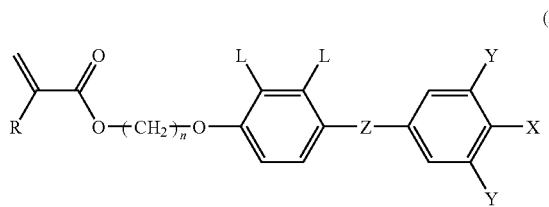

in Formula (3), R is hydrogen or methyl; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —CH$_2$CH$_2$COO—, —OCOCH$_2$CH$_2$—, —CH═CHCOO—, —OCOCH═CH—, —CH$_2$CH$_2$—, —C≡C—, —CH$_2$O— or —OCH$_2$—; and n is an integer of 1 to 10.

Preferred R is hydrogen. Preferred L is hydrogen. Preferred X is trifluoromethyl, trifluoromethoxy, cyano, alkyl of 1 to 8 carbons or alkoxy of 1 to 8 carbons. Preferred Y is hydrogen. Preferred Z is a single bond, —COO— or —OCO—. In Formula (3), Z being in a direction of —COO— is preferable to Z being in a direction of —OCO—. Preferred n is 2, 4, 6 or 8. More preferred n is 6.

Item 2. The composition according to the item 1, wherein in Formula (1), R is hydrogen or methyl; L is hydrogen, fluorine, chlorine, methyl or trifluoromethyl; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH═CHCOO— or —OCOCH═CH—; and n is an integer of 1 to 10; and wherein in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH═CHCOO— or —OCOCH═CH—; and n is an integer of 1 to 10; and wherein in Formula (3), R is hydrogen or methyl; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —CH$_2$CH$_2$COO—, —OCOCH$_2$CH$_2$—, —CH═CHCOO— or —OCOCH═CH—; and n is an integer of 1 to 10.

Item 3. The composition according to the item 1, wherein in Formula (1), R is hydrogen; L is hydrogen or fluorine; A is 1,4-phenylene, 2-fluoro-1,4-phenylene, 2,3-difluoro-1,4-phenylene, 2-methyl-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH═CHCOO— or —OCOCH═CH—; and n is an integer of 1 to 10; and wherein in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene or 2,3-bis(trifluoromethyl)-1,4-phenylene; Z is —COO—, —OCO—, —CH$_2$CH$_2$COO—, —OCOCH$_2$CH$_2$—, —CH═CHCOO— or —OCOCH═CH—; and n is an integer of 1 to 10; and wherein in Formula (3), R is hydrogen; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —CH═CHCOO— or —OCOCH═CH—; and n is an integer of 1 to 10.

Item 4. The composition according to the item 1, wherein in Formula (1), R is hydrogen; L is hydrogen; A is 1,4-phenylene, 2-methyl-1,4-phenylene, 9-methylfluorene-2,7-diyl or 9,9-dimethylfluorene-2,7-diyl; Z is —COO— or —OCO—; and n is an integer of 1 to 10; and wherein in Formula (2), L is hydrogen; A is 1,4-phenylene, 2-fluoro-1,4-phenylene, 2-methyl-1,4-phenylene or 2,3-bis(trifluoromethyl)-1,4-phenylene; Z is —COO— or —OCO—; and n is an integer of 1 to 10; and wherein in Formula (3), R is hydrogen; L is hydrogen; X is trifluoromethoxy, cyano, alkyl of 1 to 10 carbons or alkoxy of 1 to 10 carbons; Y is hydrogen; Z is a single bond, —COO— or —OCO—; and n is an integer of 1 to 10.

Item 5. The composition according to in the item 1, wherein in Formula (1), R is hydrogen; L is hydrogen; A is 1,4-phenylene, 2-methyl-1,4-phenylene, 9-methylfluorene-2,7-diyl or 9,9-dimethylfluorene-2,7-diyl; Z is —COO—, —OCO—, —CH=CHCOO— or —OCOCH=CH—; and n is an integer of 1 to 10; and wherein in Formula (2), L is hydrogen; A is 1,4-phenylene, 2-fluoro-1,4-phenylene, 2-methyl-1,4-phenylene or 2,3-bis(trifluoromethyl)-1,4-phenylene; Z is —COO—, —OCO—, —CH=CHCOO— or —OCOCH=CH—; and n is an integer of 1 to 10; and wherein in Formula (3), R is hydrogen; L is hydrogen; X is cyano; Y is hydrogen; Z is a single bond or —COO—; and n is an integer of 1 to 10.

Item 6. The composition according to any one of the items 1 to 5, wherein a ratio of the first component is 40 to 80% by weight, a ratio of the second component is 10 to 30% by weight, and a ratio of the third component is 10 to 30% by weight, each of which is based on the whole weight of the first component, the second component and the third component.

Item 7. The composition according to any one of the items 1 to 6, further containing a compound represented by Formula (4) as a fourth component:

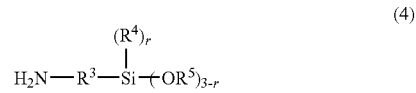

(4)

in Formula (4), $R^3$ is straight-chain alkylene of 2 to 10 carbons, and in this alkylene, one or two —CH$_2$— which are not adjacent to each other may be replaced by —O— or —NH—; $R^4$ is methyl, ethyl, propyl or isopropyl; $R^5$ is methyl, ethyl or trimethylsilyl; and r is 0, 1 or 2.

Item 8. The composition according to any one of the items 1 to 6, further containing a compound represented by Formula (4) as a fourth component:

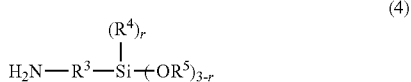

(4)

in Formula (4), $R^3$ is straight-chain alkylene of 2 to 8 carbons, and in this alkylene, one —CH$_2$— may be replaced by —NH—; $R^5$ is methyl or ethyl; and r is 0.

Item 9. The composition according to any one of the items 1 to 6, further containing a compound represented by Formula (4) as a fourth component:

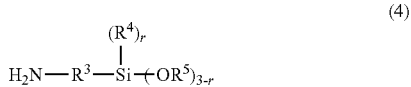

(4)

in Formula (4), $R^3$ is linear alkylene having a carbon number of 2 to 6; $R^5$ is methyl or ethyl; and r is 0.

Item 10. A composition containing a compound represented by Formula (1a) as a first component, a compound represented by Formula (2a) as a second component and a compound represented by Formula (3a) as a third component:

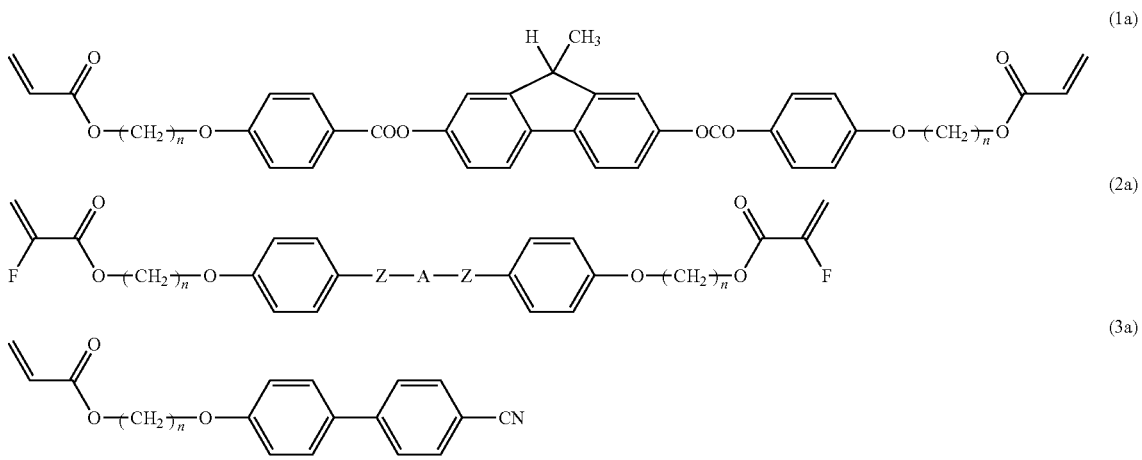

in the above formulas, A is 2-methyl-1,4-phenylene or 2,3-bis(trifluoromethyl)-1,4-phenylene; Z is —COO— or —OCO—; and n is an integer of 1 to 10.

Item 11. The composition according to the item 10, further containing a compound represented by Formula (α-1) as a fourth component, and an added amount of the fourth component is 0 to 20% by weight based on the whole weight of the first component, the second component and the third component:

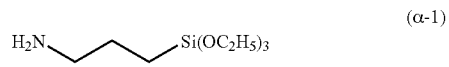

(α-1)

Item 12. A polymer obtained from the composition according to any one of the items 1 to 11.

Item 13. The polymer obtained by polymerizing the composition according to any one of the items 1 to 11, after coating the composition on a film of triacetyl cellulose treated with saponification or a supporting plate of glass.

Item 14. A phase difference plate or a polarizing plate having the polymer according to the item 12 or 13.

Item 15. A liquid crystal display device having the phase difference plate or the polarizing plate according to the item 14.

Item 16. Use of the polymer according to the item 12 or 13 as an optical compensation film.

The composition of the present invention contains at least three components of the compound (1), the compound (2) and the compound (3). This composition may further contain the compound (4) as the fourth component.

1) Composition of Three Components

This composition has a nematic phase at room temperature. The kind of orientation in this phase depends on the kind of a supporting plate, the presence or absence of rubbing treatment in the supporting plate, and the kind of the compound (2). The supporting plate treated with rubbing tends to orient the composition homogeneous, tilted and so forth. When the supporting plate has an orientation film, orientation depends as well on the kind of the orientation film in a certain case.

2) Composition of Four Components

This composition contains a silane coupling agent as the fourth component. This composition has a nematic phase at room temperature. Orientation in this phase is mainly homeotropic. This composition is oriented in a homeotropic state on a supporting plate or a supporting plate having an orientation film. A specific orientation film is not required in order to orient the composition in a homeotropic state. A supporting plate (or an orientation film and so forth) having a polar group such as —COO—, $NH_2$— and OH on a surface strongly tends to orient the composition in a homeotropic state.

The component compounds in the composition of the present invention shall be explained. The compound (1) has a liquid crystal skeleton and two polymerizable groups. A polymer of this polymerizable compound can be assumed to have a three-dimensional structure, and therefore the polymerizable compound provides a harder polymer as compared with a compound having one polymerizable group. This compound is liable to be oriented in a homogeneous state, though depending on the conditions such as a supporting plate, additives and so forth. The compound (2) has as well a liquid crystal skeleton and two polymerizable groups. This polymerizable compound provides as well a relatively hard polymer. The polymerizable group has fluorine, and therefore this compound has the effects of lowering a solidifying point of the composition and reducing defects in orientation and so forth. This compound is liable to be oriented, though depending on the conditions of a supporting plate and additives, in a homogeneous state. The compound (3) has one polymerizable group. This compound has a property to enlarge a tilt angle of other liquid crystal molecules. The compound (4) is not a polymerizable compound. This compound is a silane coupling agent used for surface treatment and so forth. This compound interacts with hydrogen of a polar group that is present on the surface of a supporting plate. This compound has the effect that makes liquid crystal molecules oriented in a homeotropic state.

The structure of the composition of the present invention shall be explained. This composition contains the compound (1), the compound (2) and the compound (3). This composition contains at least three compounds. This composition may contain two or more compounds of the compound (1), (2) or (3). This composition may further contain the compound (4). This composition may contain other polymerizable compounds which are different from the compounds (1), (2) and (3). This composition may further contain an additive such as a surfactant in order to form a thin paint film. However, the surfactant is not necessarily required for the purpose of controlling the kind of orientation. This composition may contain an additive such as a polymerization initiator, a photosensitizer and so forth which is suited to polymerization. This composition may contain an additive such as a UV absorber, an antioxidant and so forth in order to improve the characteristics of the polymer. This composition may contain an organic solvent. The organic solvent is useful for forming a paint film having an even thickness.

This composition is classified into the following composition A, composition B and so forth. The composition A contains the compounds (1), (2) and (3). The composition A may further contain the compound (4), the other polymerizable compound, the additive, the organic solvent and so forth. The composition B contains the compounds (1), (2) and (3) as the polymerizable compounds but does not contain the other polymerizable compound. The composition B may further contain the compound (4). The composition B may further contain the additive, the organic solvent and so forth. The composition B has smaller number of the components as compared with the composition A. The composition B is more preferred than the composition A from the viewpoint of the cost. The composition A is more preferred than the composition B since the characteristics thereof can further be controlled by the other polymerizable compound.

In the composition A and the composition B, the mixing ratio of the compounds (1), (2) and (3) is as follows. The preferred ratio of the compound (1) is 40 to 80%. More preferred ratio is 50 to 80%. The preferred ratio of the compound (2) is 10 to 30%. More preferred ratio is 15 to 25%. The preferred ratio of the compound (3) is 10 to 30%. More preferred ratio is 15 to 25%. The added amounts of the compound (4), the other polymerizable compound, the additive and so forth are ratios based on the whole weight of the compounds (1), (2) and (3). The preferred added amount of the compound (4) is 0 to 25%. More preferred added amount is 0 to 15% or 5 to 15%. The preferred added amount of the other polymerizable compound is 0 to 20%. More preferred added amount is 0 to 10% or 5 to 15%. The added amount of the additive such as the surfactant, the polymerization initiator and so forth may be minimum amounts to achieve the objects. The same shall apply to the added amount of organic solvent.

The compounds (1) to (4) can be synthesized by suitably combining known methods in organic synthetic chemistry. Methods for introducing or forming the intended terminal groups, rings, bonding groups and so forth into starting materials are described in Organic Syntheses, John Wiley & Sons, Inc.; Organic Reactions, John Wiley & Sons, Inc.; Comprehensive Organic Synthesis, Pergamon Press; and Shin-Jikken Kagaku Koza (New Experimental Chemical Course), Maruzen.

The synthetic method of the compound (1) is described in an international publication pamphlet WO 01/53248 A1 specification. The compound (2) is synthesized in the following manner. α-Fluoroacrylic acid or α-fluoroacrylic acid chloride can be used for a method of introducing α-fluoroacryloyloxy ($CH_2$=CF—COO—), and a method of acting α-fluoroacrylic acid fluoride ($CH_2$=CFCOOF) is more useful. The synthetic methods of α-fluoroacrylic acid fluoride are described in J. Org. Chem., 1989, 54, 5640, JP S60-158137 A/1985, JP S61-85345 A/1986 and so forth, and the synthesis is possible according to those methods. The compound (2) is synthesized by utilizing those compounds as starting materials.

Next, the examples of the component compounds shall be shown. In these examples, the compounds (1) and (2) are symmetrical in right and left. These compounds may be asymmetrical in right and left. The preferred compounds (1) are compounds (1-1), (1-2), (1-3) and so forth.

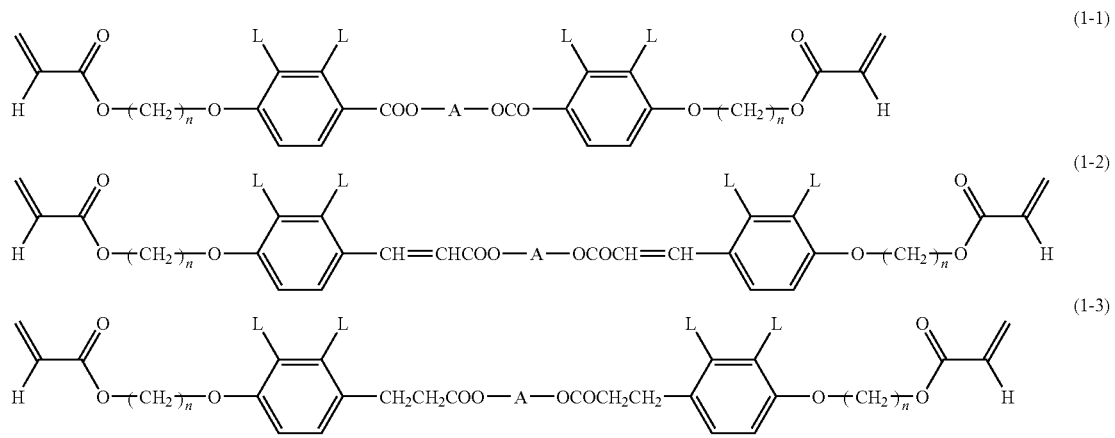

In Formulas (1-1) to (1-3), L is hydrogen or fluorine; A is 1,4-phenylene, 2-methyl-1,4-phenylene, 2-trifluoromethyl-1,4-phenylene, 2,3-bis(trifluoromethyl)-1,4-phenylene, 9-methylfluorene-2,7-diyl or 9,9-dimethylfluorene-2,7-diyl, which are described below; and n is an integer of 1 to 10.

The preferred compounds (2) are compounds (2-1), (2-2), (2-3) and so forth.

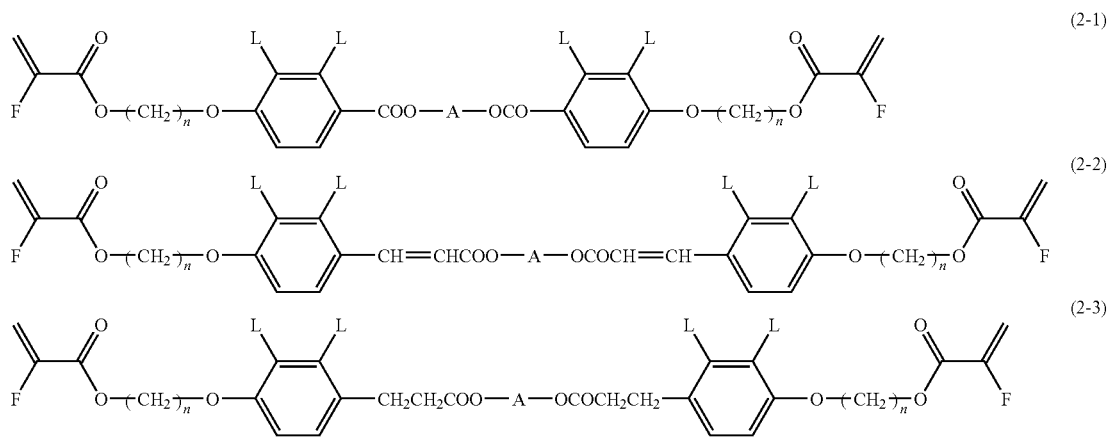

In Formulas (2-1) to (2-3), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 9-methylfluorene-2,7-diyl or 9,9-dimethylfluorene-2,7-diyl which are described below; and n is an integer of 1 to 10.

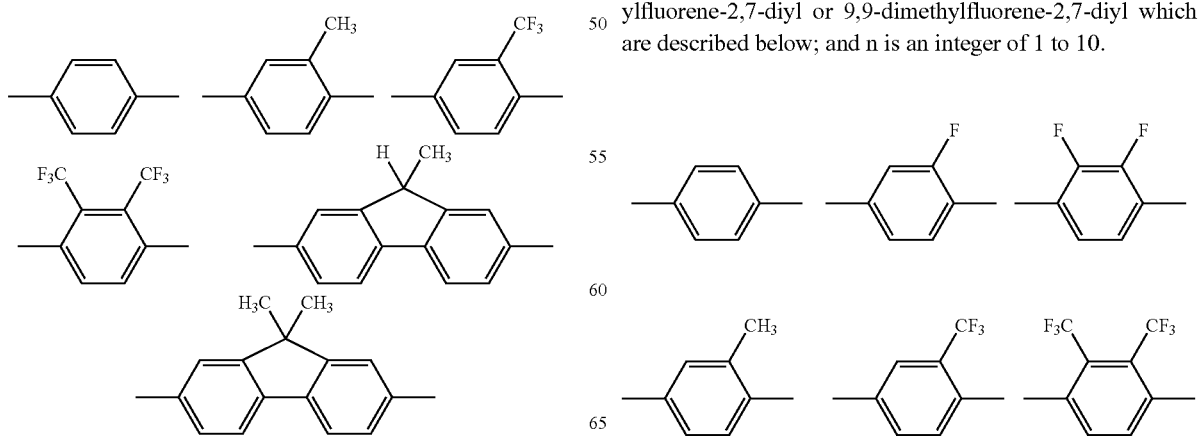

-continued

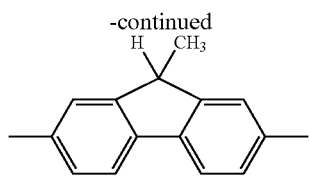

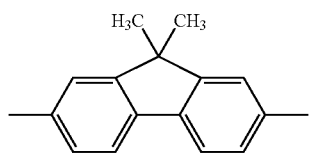

The preferred compounds (3) are compounds (3-1), (3-2), (3-3) and so forth.

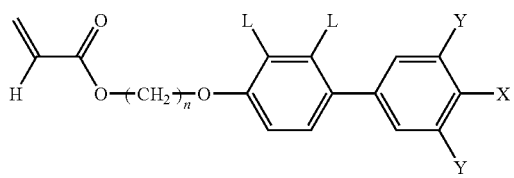
(3-1)

-continued

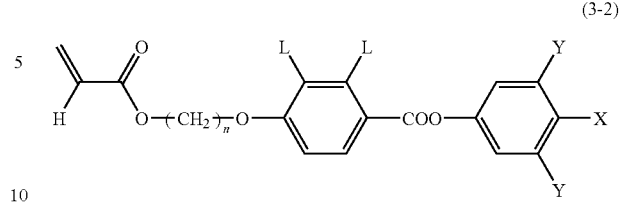
(3-2)

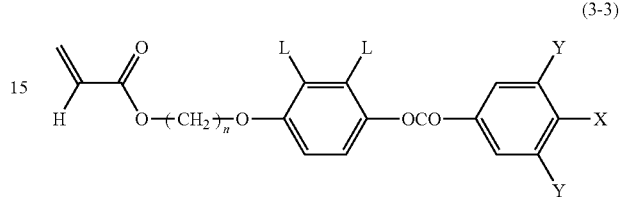
(3-3)

In Formulas (3-1) to (3-3), L is hydrogen or fluorine; X is trifluoromethyl, trifluoromethoxy, cyano, alkyl of 1 to 10 carbons or alkoxy of 1 to 10 carbons; Y is hydrogen or fluorine; and n is an integer of 1 to 10.

The preferred compounds (1), (2) and (3) are the following. The compounds (1A) to (1F) do not correspond to the compound (1-1). The compounds (2A) to (2D) do not correspond to the compound (2-1).

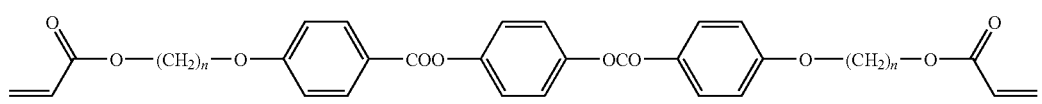
(1-1-1)

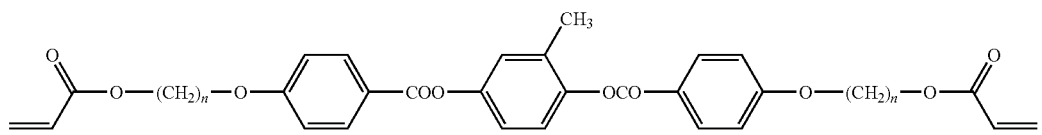
(1-1-2)

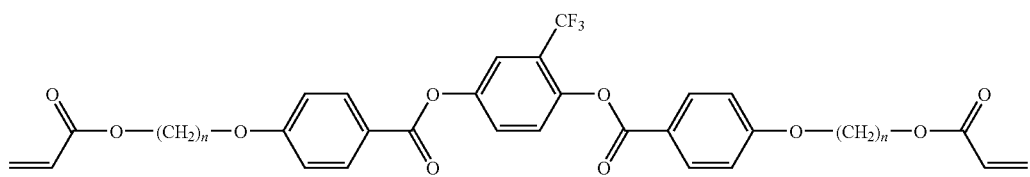
(1-1-3)

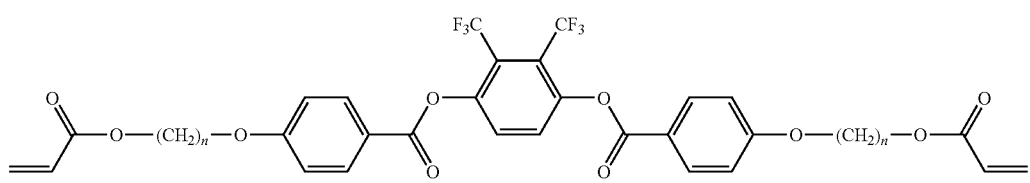
(1-1-4)

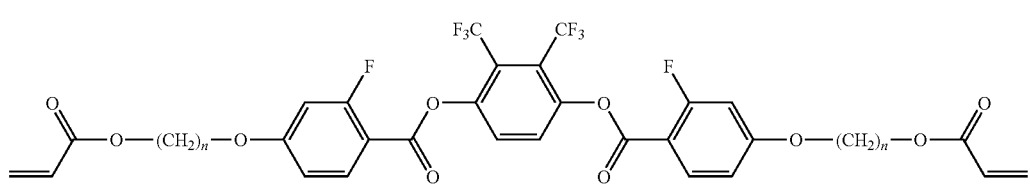
(1-1-5)

-continued
(1-1-6)
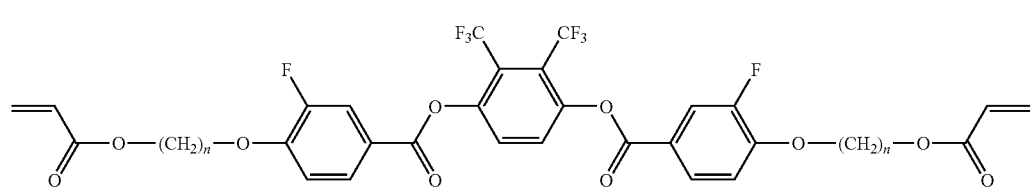
(1-1-7)
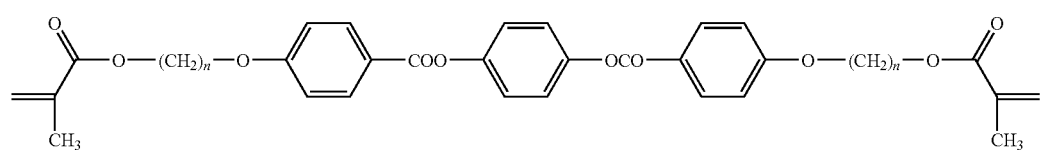
(1-1-8)
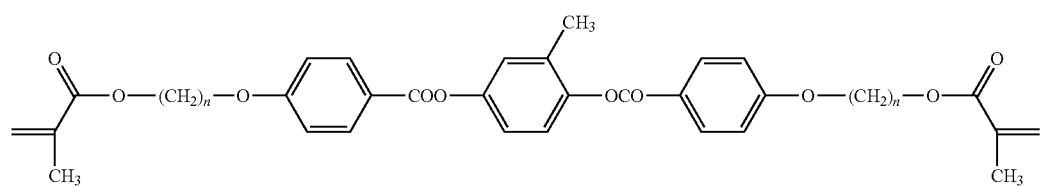
(1-1-9)
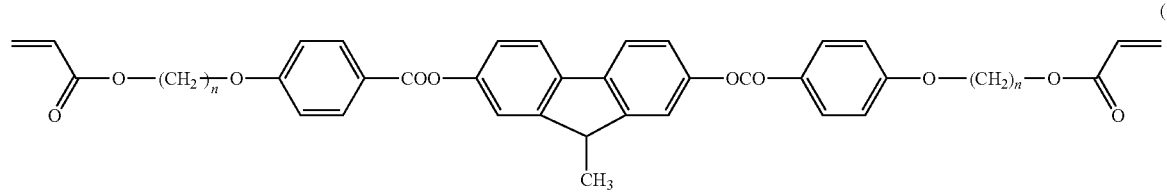
(1-1-10)
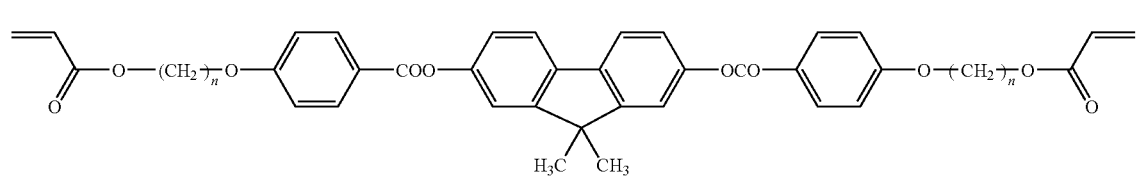
(1-1-11)
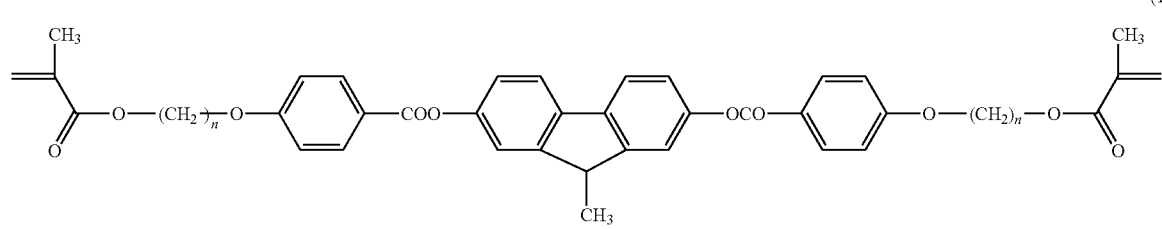
(1-1-12)
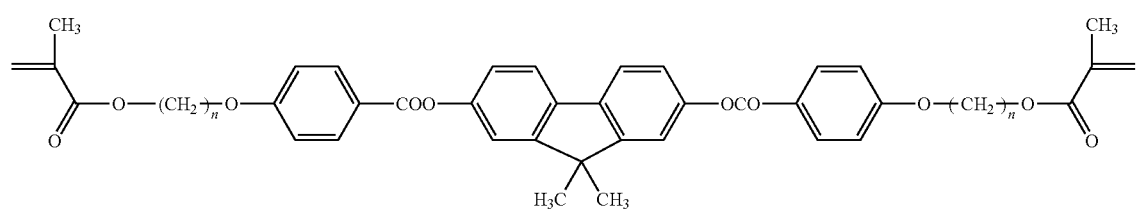
(1-2-1)
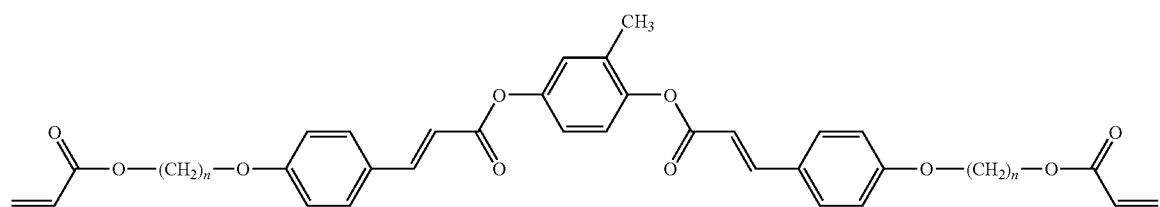

-continued
(1-2-2)
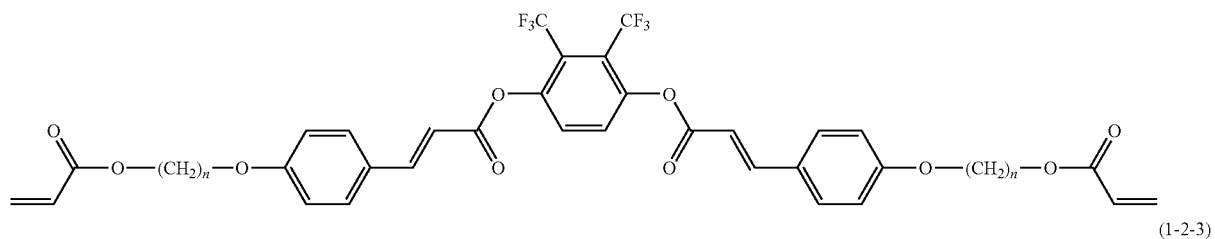
(1-2-3)
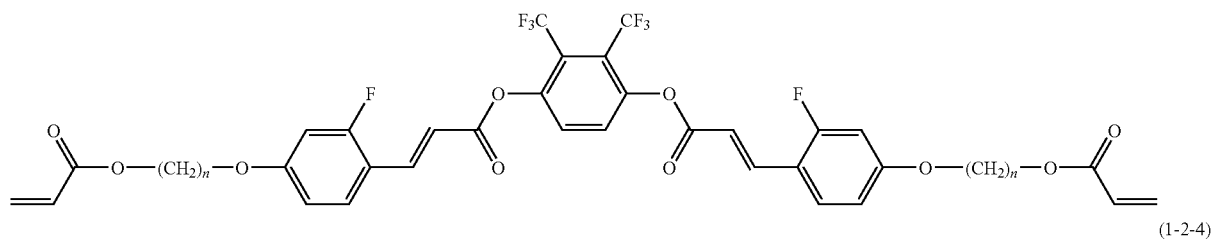
(1-2-4)
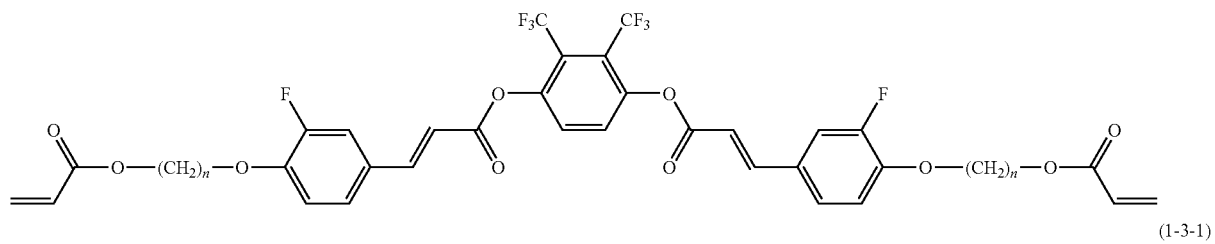
(1-3-1)
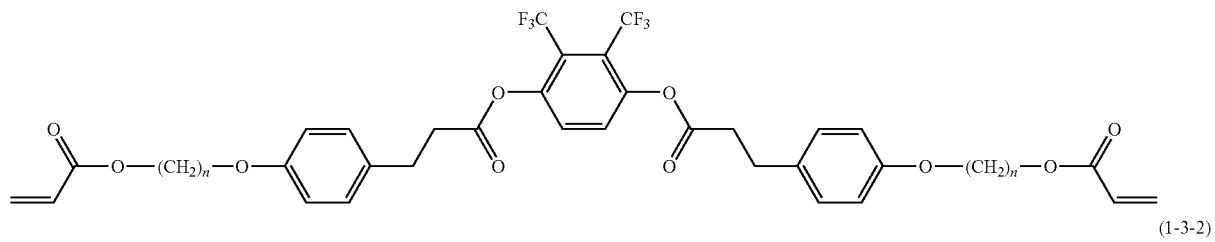
(1-3-2)
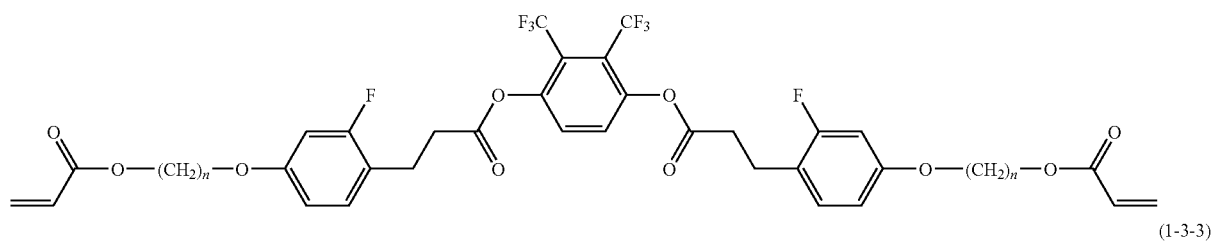
(1-3-3)
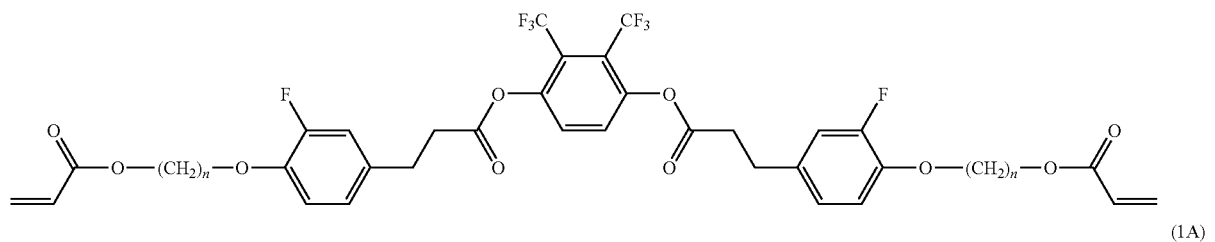
(1A)
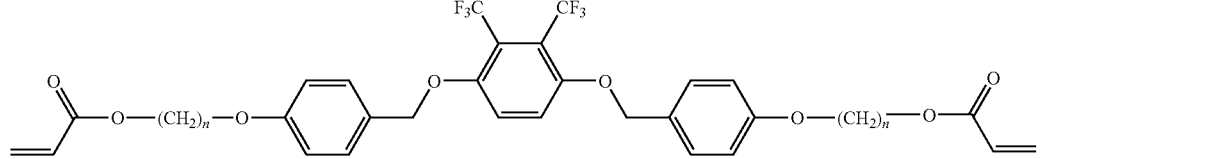

-continued
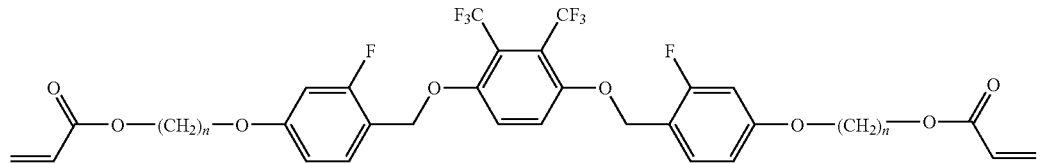
(1B)
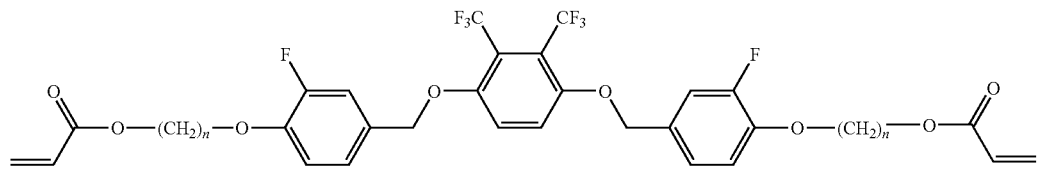
(1C)
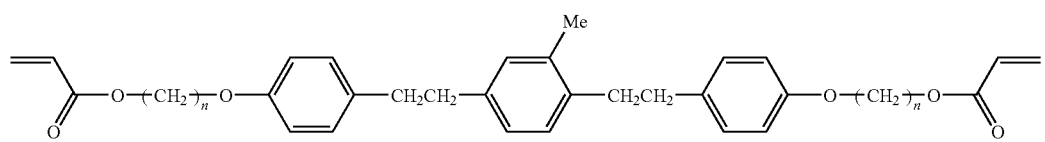
(1D)
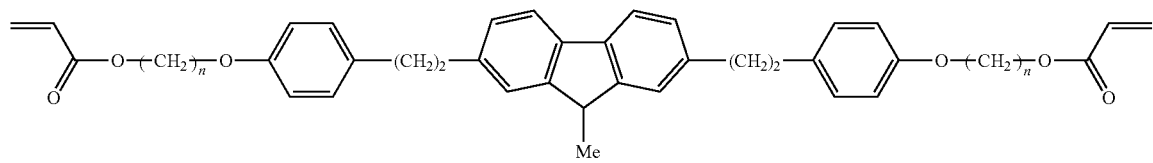
(1E)
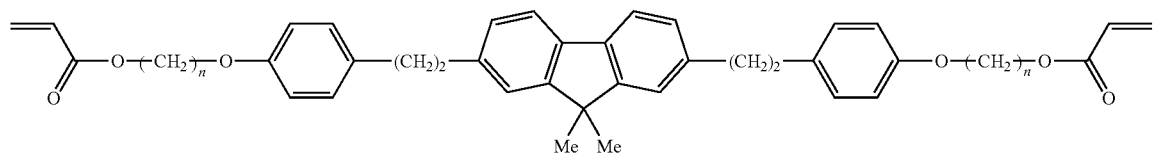
(1F)
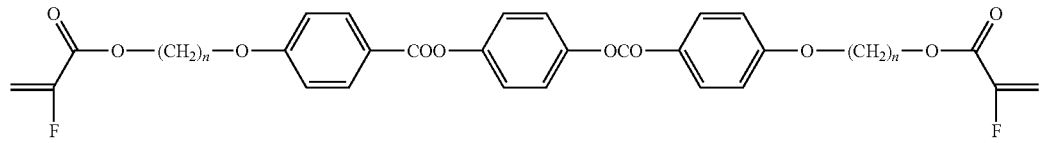
(2-1-1)
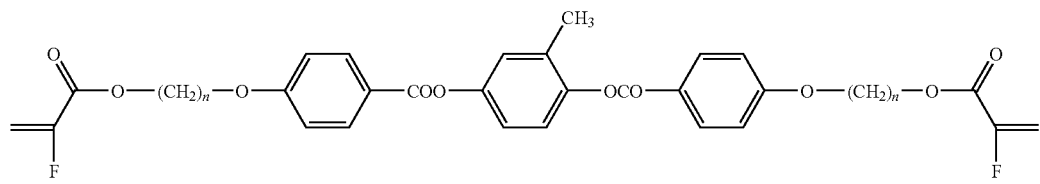
(2-1-2)
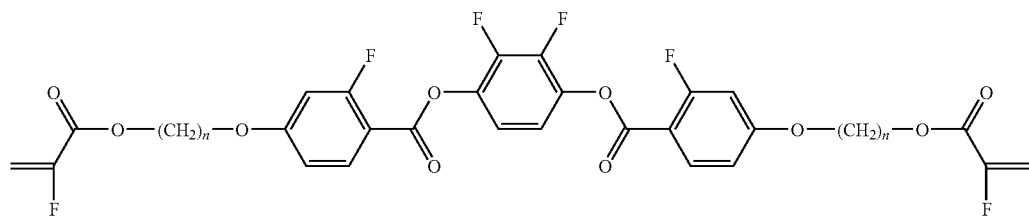
(2-1-3)

-continued
(2-1-4)
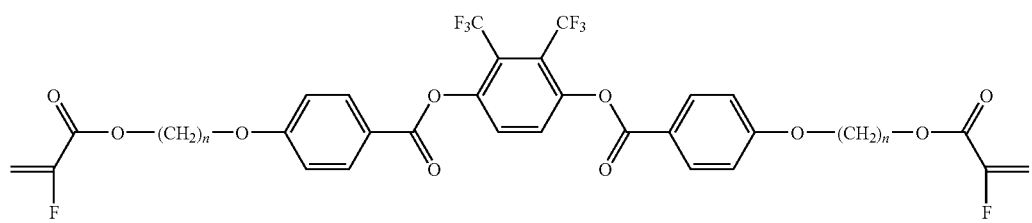
(2-2-1)
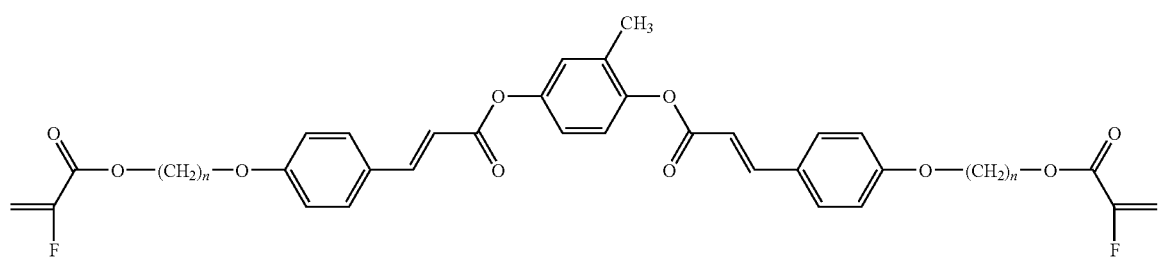
(2-2-2)
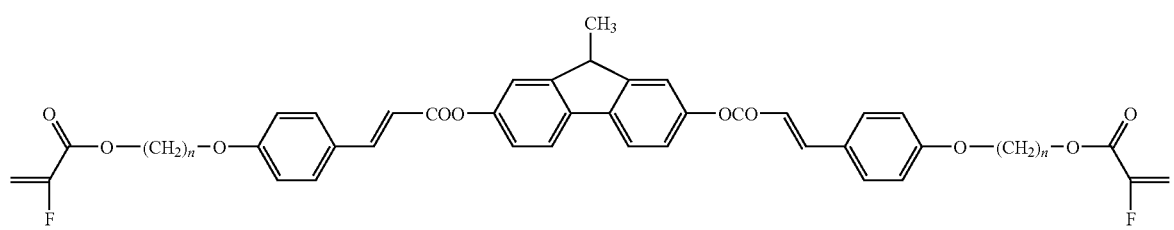
(2-3-1)
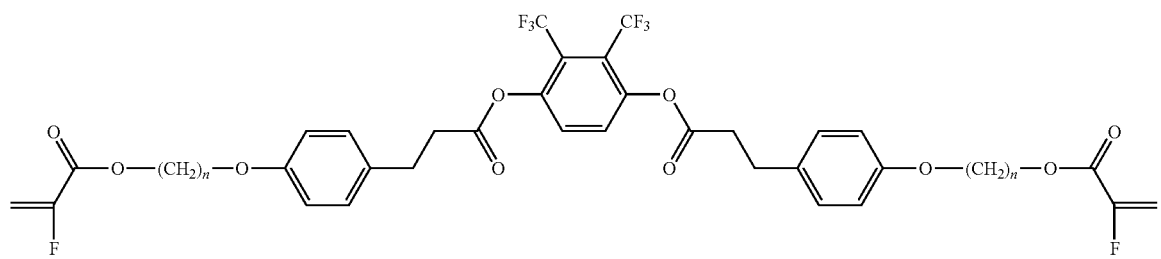
(2-3-2)
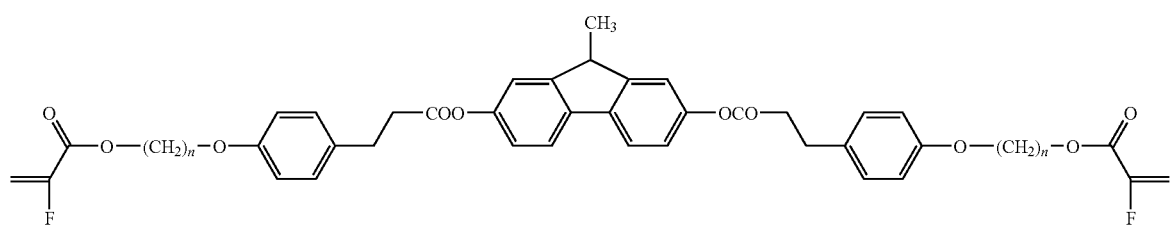
(2A)
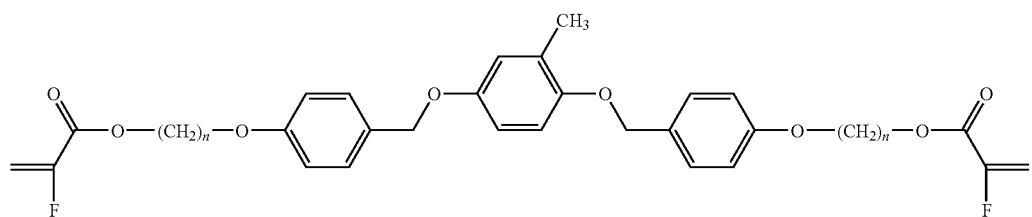

-continued
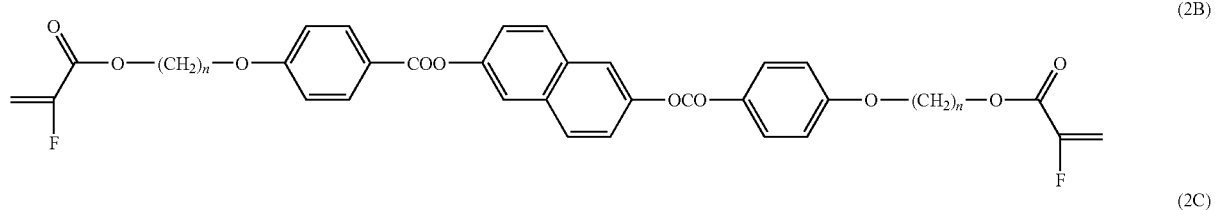
(2B)
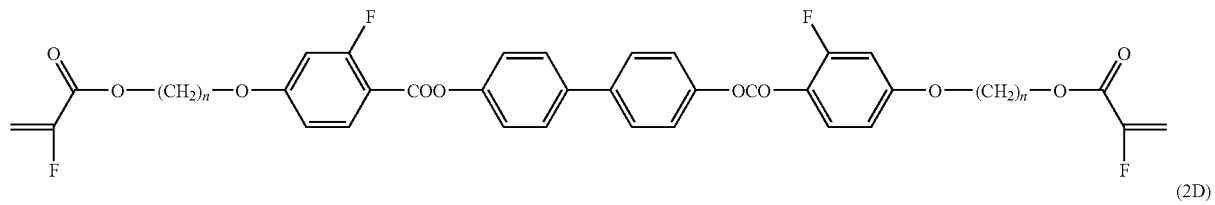
(2C)
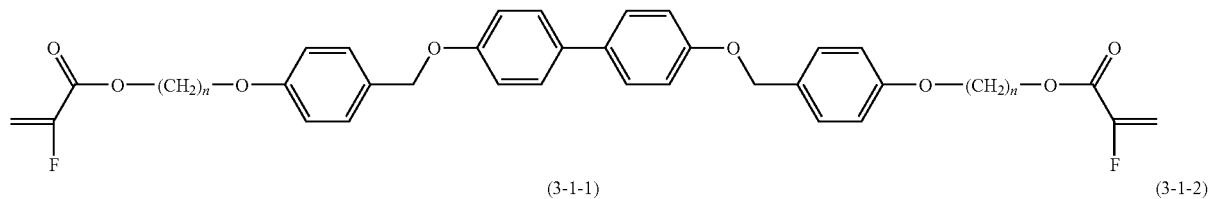
(2D)
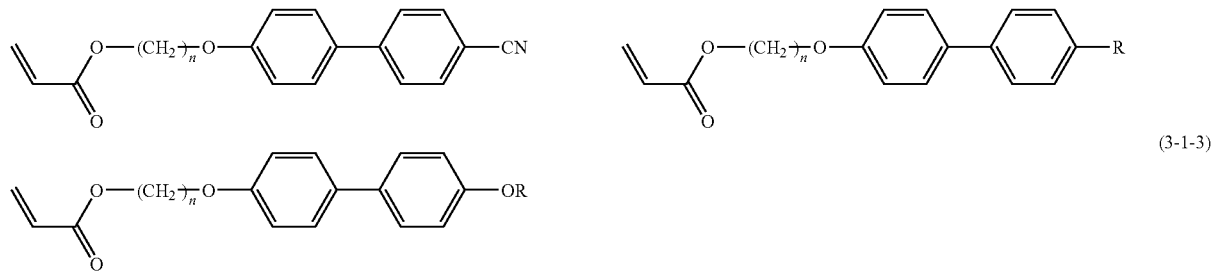
(3-1-1)
(3-1-2)
(3-1-3)
In the compounds (3-1-2) and (3-1-3), R is alkyl of 1 to 10 carbons.
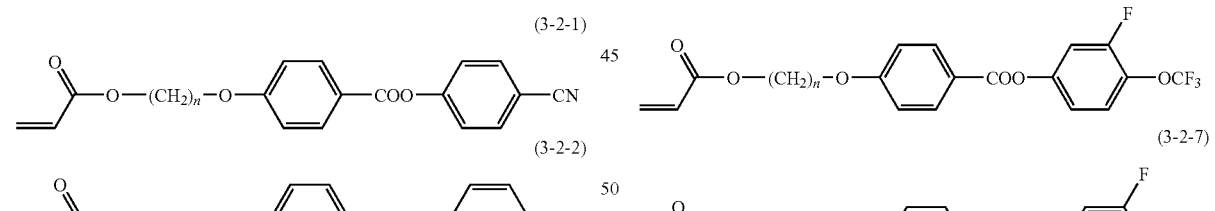
(3-2-1)
(3-2-2)
(3-2-3)
(3-2-4)
(3-2-5)
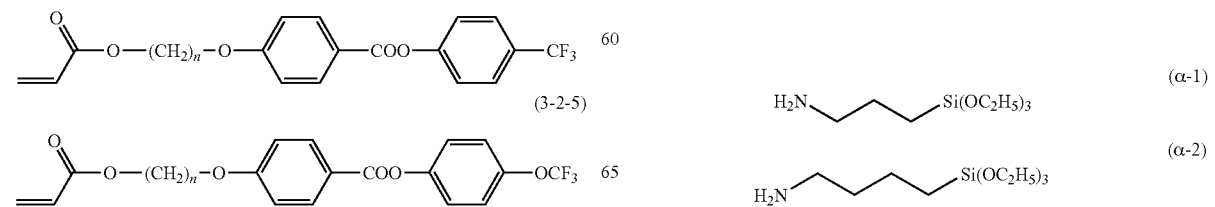
(3-2-6)
(3-2-7)
In the compounds (3-2-2) and (3-2-3), R is alkyl of 1 to 10 carbons.
The preferred compounds (4) are the following.
(α-1)
(α-2)

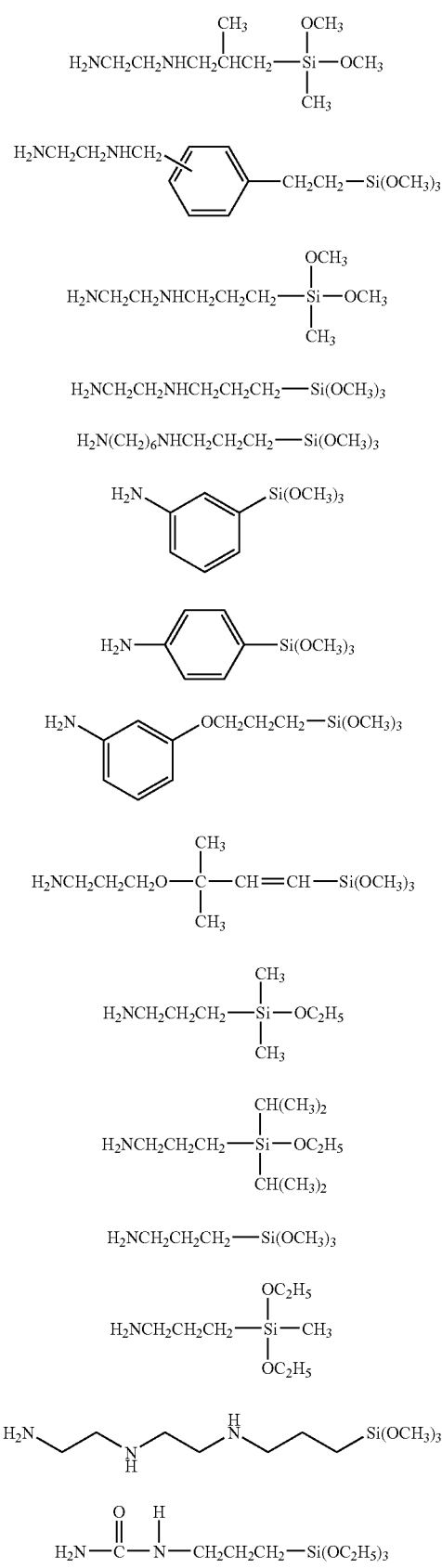

More preferred compounds (4) are the compounds (α-1), (α-2), (α-6), (α-7), (α-11), (α-14), (α-16) and so forth. The particularly preferred compounds (4) are the compounds (α-1), (α-2) and (α-14). The most preferred compound is the compound (α-1).

Next, the examples of the other polymerizable compound, the additive and the organic solvent shall be shown. These compounds may be commercially available products. The examples of the other polymerizable compounds are compounds having one polymerizable group such as methyl (meth)acrylate and acrylonitrile, and compounds having at least two polymerizable groups such as 1,4-butanediol di(meth)acrylate and so forth. The examples of the surfactant are polyethylene glycol, esters of polyethylene glycol, polyethylene glycol fatty acid esters, perfluoroalkylethlene oxide adducts, oligomers having a perfluoroalkyl group and a hydrophilic group, oligomers having a perfluoroalkyl group and a lipophilic group, urethane having a perfluoroalkyl group and so forth. The examples of the polymerization initiator are photopolymerization initiators such as 2-hydroxy-2-methyl-1-phenylpropane-1-one, Irgacure 907 (manufactured by Ciba Specialty Chemicals Inc.) and so forth. The examples of the photosensitizer are isopropylthioxanthone and so forth. The examples of the UV absorber are Tinuvin PS (manufactured by Ciba Specialty Chemicals Inc.), Tinuvin 400 (manufactured by Ciba Specialty Chemicals Inc.) and so forth. The examples of the antioxidant is Irganox 1076 (manufactured by Ciba Specialty Chemicals Inc.) and so forth. The examples of the organic solvent are non-polar solvents such as benzene, toluene, xylene, carbon tetrachloride, and polar solvents such as ethanol, 2-propanol, butanol, ethyl acetate, lactic acid esters (ethyl lactate), dimethylformamide, N-methyl-2-pyrrolidone, γ-butyrolactone, propylene glycol monoethyl ether acetate and so forth.

A polymer film is prepared from the composition of the present invention in the following manner. When the composition contains an organic solvent, a paint film obtained by vaporizing the organic solvent is prepared on a supporting plate. The organic solvent is vaporized by methods such as blowing, heating and so forth. The heating method is preferred from the viewpoint of reducing defects in orientation. This is because when lowering the temperature of the composition, orientation is stabilized by rearrangement. The preferred temperature is in the order of 120° C. or less, 90° C. or less and 70° C. or less. The composition of this paint film has a nematic phase at room temperature in many cases. Next, this paint film is irradiated with a UV ray and so forth to polymerize the composition. The temperature of the paint film is preferably room temperature. This is because stabilized orientation can be fixed as it is by polymerization. When this paint film does not have a nematic phase at room temperature, the paint film is heated until the temperature gets into a temperature range of this phase, and then it is irradiated with a UV ray.

The examples of the supporting plate are a plastic film such as polyethylene naphthalate, polycarbonate, triacetyl cellulose (hereinafter abbreviated as TAC), norbornene resins and so forth, and a glass plate and so forth. A supporting plate of TAC may be used as it is, or its surface may be treated with saponification (hydrolytic treatment). The supporting plate may be covered with an orientation film such as polyimide. The examples of the orientation film are polyamic acid, polyimide, polyamide, products obtained by hydrolyzing silane coupling agents and so forth. Commercially available products may be used as they are for the orientation film. The chemical structure of polyamic acid which is a precursor of an oriented film may be selected for the purpose of controlling a tilt angle of liquid crystal molecules. Such supporting plate (or an orientation film) may be treated with rubbing of a cloth of rayon, cotton, polyamide and so forth on its surface before preparing the paint film.

The paint film of the composition is prepared on the supporting plate in an even thickness. Preferred is a method in which the composition dissolved in the organic solvent is coated and then the organic solvent is vaporized. The composition is coated by methods such as a spin coating method, a dip coating method, a gravure coating method, a micro gravure coating method, a die coating method, a wire bar coating method and so forth. The composition of the paint film is polymerized by irradiating with light such as electron beams, UV rays, visible rays, infrared rays (heat rays) and so forth, after removing the organic solvent. UV rays are preferred from the viewpoint of polymerization at room temperature. A preferred range of the wavelength is 150 to 500 nm. More preferred range is 250 to 450 nm, and the particularly preferred range is 300 to 400 nm. The examples of the light source are a metal halide lamp, a xenon lamp, a ultrahigh voltage mercury lamp, a high voltage mercury lamp and so forth. A preferred range of the intensity of radiation is 10 to 3000 $mJ/cm^2$, and more preferred range is 100 to 2000 $mJ/cm^2$.

The polymer of the present invention has a form such as a film, a plate, a particle, a powder and so forth. The polymer may be molded. A preferred thickness of the polymer depends on a value of an optical anisotropy and its uses. A preferred thickness of the polymer film is in the range of 0.05 to 50 μm. More preferred thickness is in the range of 0.1 to 20 μm. The particularly preferred thickness is in the range of 0.5 to 10 μm. A haze value of these polymers is generally 1.5% or less. A transmittance of these polymers is generally 80% or more in a visible light area. Such polymers are suitable to a thin film of optical anisotropy used for liquid crystal display devices.

The polymer has a function of optical compensation and therefore is used for a phase difference plate, a polarizing plate and so forth. The polymer film is useful for liquid crystal display devices of a TN type (a twisted nematic type), an STN type (a super twisted nematic type) and so forth for the purpose of optical compensation. The polymer film is useful as well for optical devices integrated with a polarizing plate and so forth. The polymer film may be used by each pixel of blue, green or red in a liquid crystal display device. Refer to, for example, JP 2001-222009 A/2001. When a liquid crystalline compound is dispersed in the polymer film, there are uses for liquid crystal display devices of a polymer-dispersed type, liquid crystal display devices of a holographic polymer-dispersed type and so forth. Refer to, for example, JP H6-340587 A/1994. The polymer film obtained from the composition containing an optically active compound has a twisted orientation in which liquid crystal molecules are regularly twisted like a spiral. When a length of a spiral pitch is about several μm, the polymer film has a function as an azimuth rotator.

EXAMPLES

The present invention shall be explained below in details with reference to examples and the present invention, however, shall not be restricted to these examples. Methods of polymerization, measurement, evaluation and so forth in the examples were as follows.

(1) Paint film of a composition: A composition diluted with a solvent was coated on a supporting plate by a spin coating method. The supporting plate was heated at 70° C. for 3 minutes to remove the solvent. The paint film formed was observed whether or not it had a liquid crystal phase such as a nematic phase at room temperature for 3 minutes.

(2) Polymerization of a composition: The paint film formed on the supporting plate was irradiated with a UV ray (30 $mW/cm^2$: 365 nm) at 25° C. for 30 seconds under nitrogen atmosphere by means of a ultrahigh pressure mercury lamp (250 W). The polymer film thus obtained was interposed between two polarizing plates disposed in a cross nicols state. When this film stayed in a dark field, the presence of light leaking (fine transmission of light) was observed. The light leaking is generated when liquid crystals are defective in orientation. When the light leaking was not observed, it was judged that orientation was even.

(3) Orientation of liquid crystal molecules: Orientation of the polymer film was determined based on an angle dependency of a transmitted light intensity.

1) Observation by naked eyes—the polymer film was interposed between two polarizing plates disposed in a cross nicols state, and the film surface was irradiated with light from a vertical direction (a gradient angle was 0 degree). A change in the transmitted light was observed while changing the gradient angle of irradiation from 0 degree to, for example, 60 degrees. A direction of irradiation inclined was allowed to agree with a direction of rubbing (a longitudinal direction of the liquid crystal molecules). When the transmitted light from a vertical direction was maximum, it was judged that orientation was homogeneous. This is because a director of the liquid crystal molecules is parallel to a supporting plate in homogeneous orientation. On the other hand, when the transmitted light from a vertical direction was minimum and the transmitted light grew large as the gradient angle was increased, it was judged that orientation was homeotropic. This is because a director of the liquid crystal molecules is vertical to a supporting plate in homeotropic orientation. There is a case that the transmitted light from a vertical direction is not maximized or minimized when the gradient angel is changed from 60 degrees to minus 60 degrees through 0 degree. Refer to FIG. 2. Orientation in this case was judged as tilted. This is because the director is standing up from a parallel state to a vertical state as the director becomes apart from the plate in tilted orientation.

2) Measurement by a polarization analyzing apparatus—an OPTIPRO polarization analyzing apparatus manufactured by Shintec Co., Ltd. was used. The polymer film was irradiated with light having a wavelength of 550 nm. Retardation (phase lag) was measured while reducing an incident angle of this light from 90 degrees to the film face. The retardation is shown by $\Delta n \times d$. The code $\Delta n$ is optical anisotropy, and the code d is a thickness of the polymer film.

Example 1

Preparation of the Polymer Film (1)

Added to a mixture of the following three components was a polymerization initiator, Irgacure 907 (manufactured by Ciba Specialty Chemicals Inc.) of 3% by weight based on the above mixture. Toluene was further added to the mixture to prepare the composition (1) of a solution of 25% by weight.

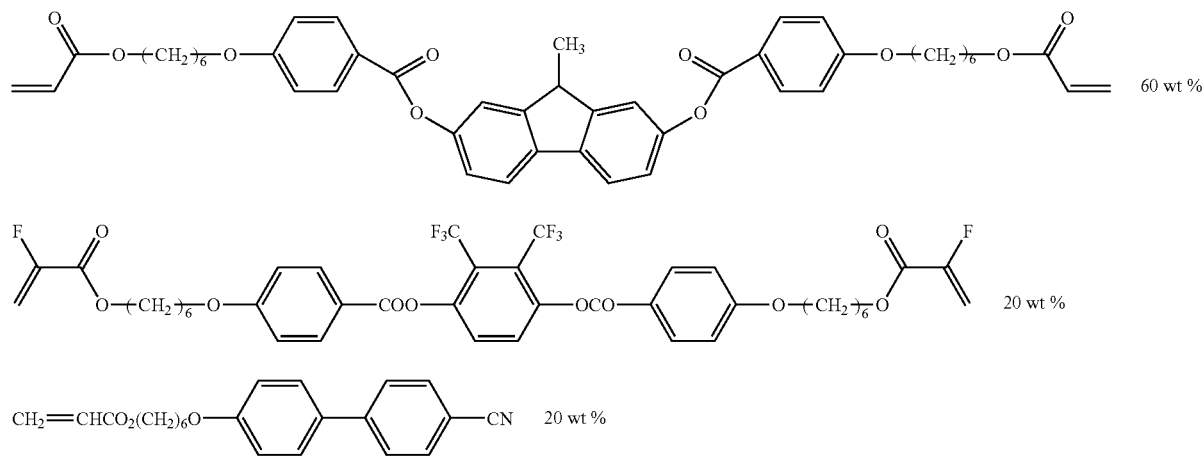

A supporting plate was a TCA film treated with saponification that was rubbed with a rayon cloth (YA-18R manufactured by Yoshikawa Chemical Co., Ltd.). The composition (1) was coated on the supporting plate and heated. The resulting paint film was transparent at room temperature for 3 minutes and had a nematic phase. Next, the paint film was irradiated with a UV ray to give the polymer film (1). This film had even homogeneous orientation. Results obtained by measuring retardation of the film are shown in FIG. 1.

Example 2

Preparation of the Polymer Film (2)

Added to a mixture of the following three components was the polymerization initiator, Irgacure 907 (manufactured by Ciba Specialty Chemicals Inc.) of 3% by weight based on the above mixture. Toluene was further added to the mixture to prepare the composition (2) of a solution of 25% by weight.

A supporting plate was a TAC film treated with saponification that was rubbed by a rayon cloth (YA-18R manufactured by Yoshikawa Chemical Co., Ltd.). The composition (2) was coated on the above supporting plate and heated. The resulting paint film was transparent at room temperature for 3 minutes and had a nematic phase. Next, the paint film was irradiated with a UV ray to obtain a polymer film (2). This film had even tilted orientation. Results obtained by measuring retardation of the above film are shown in FIG. 2.

Example 3

Preparation of the Polymer Film (3)

Alkoxysilane (α-1) of 10% by weight based on the whole weight of the three components was added to the composition (1) prepared in Example 1 to give the composition (3).

A supporting plate was a TAC film treated with saponification that was not rubbed. The composition (3) was coated on the supporting plate and heated. The resulting paint film was transparent at room temperature for 3 minutes and had a nematic phase. Next, the paint film was irradiated with a UV ray to give the polymer film (3). This film had even homeotropic orientation. Results obtained by measuring retardation of the film are shown in FIG. 3.

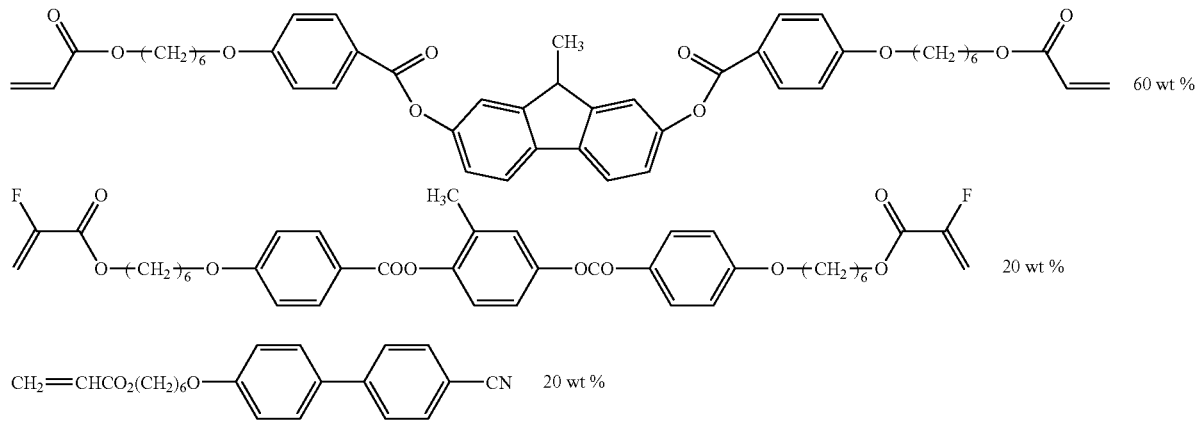

Example 4

Preparation of the Polymer Film (4)

Alkoxysilane (α-1) of 10% by weight based on the whole weight of the three components was added to the composition (2) prepared in Example 2 to give the composition (4).

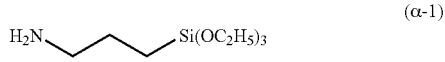
(α-1)

A supporting plate was a TAC film treated with saponification that was not rubbed. The composition (4) was coated on the supporting plate and heated. The resulting paint film was transparent at room temperature for 3 minutes and had a nematic phase. Next, the paint film was irradiated with a UV ray to obtain the polymer film (4). This film had even homeotropic orientation. Retardation of the film was measured to give a curve, which is similar to that shown in FIG. 3.

Example 5

Preparation of the Polymer Film (5)

A glass plate having the orientation film (1) was used for a supporting plate. A precursor of the orientation film (1) is polyamic acid. This polyamic acid was prepared in the following manner.

1) Preparation of Polyamic Acid

Reaction was carried out under nitrogen atmosphere. A four neck flask of 200 mL was charged with 4,4'-diaminodiphenylmethane (3.02 g; $1.52 \times 10^{-2}$ mol) and dehydrated N-methyl-2-pyrrolidone (54.0 g), and this solution was cooled down to 5° C. Cyclobutanetetracarboxylic acid dianhydride (2.98 g; $1.52 \times 10^{-2}$ mol) was added to the solution and stirred at room temperature for 30 hours. The reaction was traced by measuring a viscosity of the reaction mixture. After the reaction had completed, butyl cellosolve (40.0 g) was added thereto to prepare a 6.0 weight % solution of polyamic acid. This solution was heated at 50° C. for 2 hours to give the polyamic acid (1). The solution thus obtained had a viscosity of 60 mPa·s. The viscosity was measured at 25° C. by means of an E type viscometer. The solution had a weight average molecular weight of 50,000. The weight average molecular weight was measured at a column temperature of 50° C. by means of a GPC measuring apparatus (Chromatopack C-R7A) manufactured by Shimadzu Corporation. The standard solution was polystyrene, and the effluent solution was DMF.

2) Preparation of an Oriented Film

The solution of the polyamic acid (1) thus obtained was coated on a glass plate by a spin coating method. This plate was pretreated at 80° C. for 3 minutes and then further heated at 90° C. for 5 minutes to give a glass substrate having an orientation film. This orientation film of polyamic acid was not rubbed.

3) Polymerization

The composition (4) obtained in Example (4) was coated on the above glass substrate and heated. The resulting paint film was transparent at room temperature for 3 minutes and had a nematic phase. Next, the paint film was irradiated with a UV ray to give the polymer film (5). This film had even homeotropic orientation. Retardation of the film was measured to give a curve which is similar to that shown in FIG. 3.

Example 6

Preparation of the Polymer Film (6)

1) Preparation of an orientation film The solution of the polyamic acid (1) obtained in Example was coated on a glass substrate by a spin coating method. This plate was pretreated at 80° C. for 3 minutes and then further heated at 210° C. for 30 minutes to give a glass plate having the orientation film. This orientation film of polyimide was not rubbed.

2) Polymerization

The composition (4) obtained in Example (4) was coated on the glass substrate and heated. The resulting paint film was transparent at room temperature for 3 minutes and had a nematic phase. Next, the paint film was irradiated with a UV ray to obtain the polymer film (6). This film had even homeotropic orientation. Retardation of the above film was measured to obtain a curve which is similar to that shown in FIG. 3.

Example 7

Preparation of the Polymer Film (7)

1) Preparation of an Orientation Film

A supporting plate was a TAC film treated with saponification that was not rubbed. Sila-ace SF330 marketed from Chisso Corporation was diluted with ethanol to prepare a 25% mixed solution of ethanol/water. SF330 is a product obtained by hydrolyzing 3-aminopropyltriethoxysilane. The solution was coated on a supporting plate by a spin coating method and heated at 100° C. for 3 minutes to prepare an orientation film. This orientation film was not rubbed.

2) Polymerization

The composition (4) obtained in Example (4) was coated on the supporting plate obtained above and heated. Next, the supporting plate was irradiated with a UV ray to obtain the polymer film (7). This film had even homeotropic orientation. Retardation of the film was measured to give a curve which is similar to that shown in FIG. 3.

Comparative Example 1

Preparation of a Polymer Film A

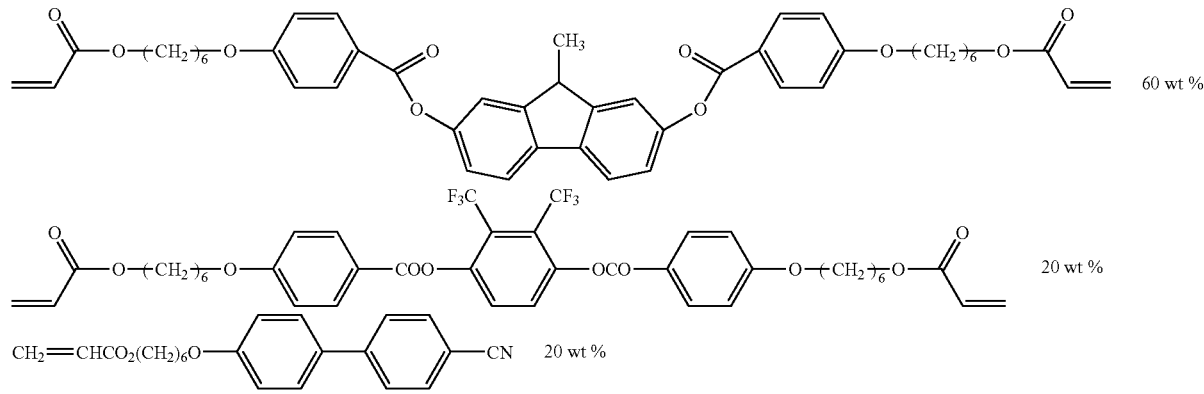

Added to a mixture of the three components described above was the polymerization initiator, Irgacure 907 of 3% by weight based on the mixture. Toluene was further added to the mixture to give the composition A of a solution of 25% by weight. A paint film was obtained by a similar procedure described in that of Example 1, except that the composition A was used instead of the composition (1). The paint film was solid and did not have a liquid crystal phase.

Comparative Example 2

Preparation of the Polymer Film B

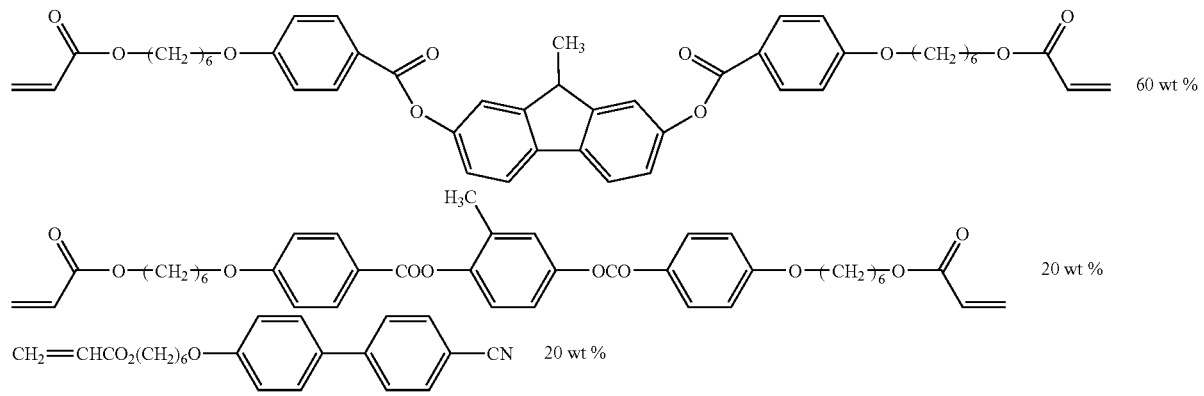

Added to a mixture of the three components described above was the polymerization initiator, Irgacure 907 of 3% by weight based on the above mixture. Toluene was added to the above mixture to prepare the composition B of a solution of 75% by weight. A paint film was obtained in a similar procedure to Example, except that the composition B was used instead of the composition (1). The paint film had a nematic phase but had a lot of defects in orientation, and the appearance thereof was cloudy. Next, the paint film was irradiated with a UV ray to give the polymer film B. The appearance of this film remained cloudy

Comparative Example 3

Preparation of the Polymer Film C

Alkoxysilane (α-1) of 10% by weight based on the whole weight of the three components was added to the composition B obtained in Comparative Example 2 to give a composition C. A paint film was obtained by the similar procedure to that of Example 3, except that the composition C was used instead of the composition (3). The paint film had a nematic phase but had a lot of defects in orientation, and its appearance was cloudy. A polymer film C obtained from the paint film had a lot of defects in orientation, and its appearance was cloudy.

INDUSTRIAL APPLICABILITY

As apparent from the results obtained in the examples and the comparative examples described above, the compositions of the present invention provided the paint films having an evenly oriented liquid crystal phase. This crystal phase was fixed by polymerization while it was maintained. The kind of the orientation depends on the kinds of the compounds (1), (2) and (3), the presence of the compound (4), the quality of the plate, the presence of the orientation film and so forth. Suitable selection of them makes it possible to obtain the polymer having the targeted orientation. The polymer film having even homeotropic orientation can be provided by the present invention. The polymer has a function of optical compensation and therefore is suited to uses for a phase difference plate, a polarizing plate and so forth.

BRIEF EXPLANATION OF THE DRAWINGS

FIG. 1 is a diagram in Example 1 (homogeneous orientation): Results obtained by measuring retardation of the polymer film (1) obtained in Example 1.

FIG. 2 is a diagram in Example 2 (tilt orientation): Results obtained by measuring retardation of the polymer film (2) obtained in Example 2.

FIG. 3 is a diagram in Example 3 (homeotropic orientation): Results obtained by measuring retardation of the polymer film (3) obtained in Example 3.

What is claimed is:

1. A composition comprising at least one compound represented by Formula (1) as a first component, at least one compound represented by Formula (2) as a second component and at least one compound represented by Formula (3) as a third component:

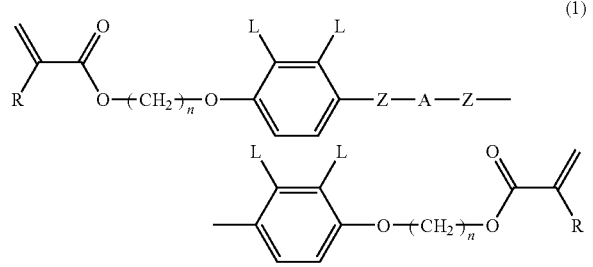
(1)

in Formula (1), R is hydrogen or methyl; L is hydrogen, fluorine, chlorine, methyl, trifluoromethyl or cyano; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl) -1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH=CHCOO—, —OCOCH=CH—, —CH$_2$CH$_2$—, —C≡C—, —CH$_2$O— or —OCH$_2$—; and n is an integer of 1 to 10;

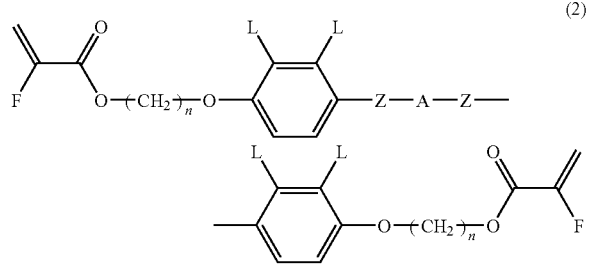
(2)

in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH=CHCOO—, —OCOCH=CH—, —CH$_2$CH$_2$—, —C≡C—, —CH$_2$O— or —OCH$_2$—; and n is an integer of 1 to 10;

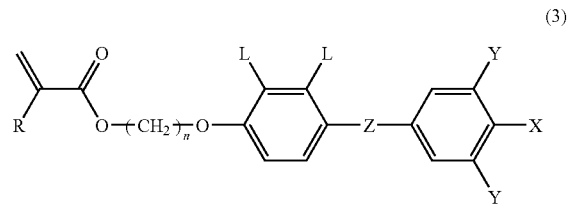
(3)

in Formula (3), R is hydrogen or methyl; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —CH$_2$CH$_2$COO—, —OCOCH$_2$CH$_2$—, —CH=CHCOO—, —OCOCH=CH—, —CH$_2$CH$_2$—, —C≡C—, —CH$_2$O— or —OCH$_2$—; and n is an integer of 1 to 10.

2. The composition according to claim 1, wherein in Formula (1), R is hydrogen or methyl; L is hydrogen, fluorine, chlorine, methyl or trifluoromethyl; A is 1,4-phenylene, 2-fluoro-1,4-phenylene, 2,3-difluoro-1,4-phenylene, 2-methyl-1,4-phenylene, 2 -trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH=CHCOO— or —OCOCH=CH—; and n is an integer of 1 to 10; and wherein in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene, 2,3-bis(trifluoromethyl)-1,4-phenylene, 4,4'-biphenylene, 2,6-naphthylene, 9-methylfluorene-2,7-diyl or 9,9-dimethylfluorene-2,7-diyl; Z is —COO—, —OCO—, —CH$_2$CH$_2$COO—, —OCOCH$_2$CH$_2$—, —CH=CHCOO— or —OCOCH=CH—; and n is an integer of 1 to 10; and wherein in Formula (3), R is hydrogen or methyl; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —CH$_2$CH$_2$COO—, —OCOCH$_2$CH$_2$—, —CH=CHCOO— or —OCOCH=CH—; and n is an integer of 1 to 10.

3. The composition according to claim 1, wherein in Formula (1), R is hydrogen; L is hydrogen or fluorine; A is 1,4-phenylene, 2-fluoro-1,4-phenylene, 2,3-difluoro -1,4-phenylene, 2-methyl-1,4-phenylene, 4,4'-biphenylene, 2,6-naphthylene, 9-methylfluorene -2,7-diyl or 9,9-dimethylfluorene-2,7-diyl; Z is —COO—, —OCO—, —CH$_2$CH$_2$COO—, —OCOCH$_2$CH$_2$—, —CH=CHCOO— or —OCOCH=CH—; and n is an integer of 1 to 10; and wherein in Formula (2), L is hydrogen or fluorine; A is 1,4-phenylene, 2-fluoro-1,4-phenylene, 2,3-difluoro-1,4-phenylene, 2-methyl-1,4-phenylene, 2-trifluoromethyl-1,4-phenylene or 2,3-bis(trifluoromethyl)-1,4-phenylene; Z is —COO—, —OCO—, —CH$_2$CH$_2$COO—, —OCOCH$_2$CH$_2$—, —CH=CHCOO— or —OCOCH=CH—; and n is an integer of 1 to 10; and wherein in Formula (3), R is hydrogen; L is hydrogen or fluorine; X is trifluoromethyl, trifluoromethoxy, cyano, alkyl of 1 to 10 carbons or alkoxy of 1 to 10 carbons; Y is hydrogen or fluorine; Z is a single bond, —COO—, —OCO—, —CH=CHCOO— or —OCOCH=CH—; and n is an integer of 1 to 10.

4. The composition according to claim 1, wherein in Formula (1), R is hydrogen; L is hydrogen; A is 1,4-phenylene, 2-methyl-1,4-phenylene, 9-methylfluorene-2,7-diyl or 9,9-dimethylfluorene-2,7-diyl; Z is —COO— or —OCO—; and n is an integer of 1 to 10; and wherein in Formula (2), L is hydrogen; A is 1,4-phenylene, 2-fluoro-1,4-phenylene, 2-methyl-1,4-phenylene or 2,3-bis(trifluoromethyl)-1,4-phenylene; Z is —COO— or —OCO—; and n is an integer of 1 to 10; and wherein in Formula (3), R is hydrogen; L is hydrogen; X is trifluoromethoxy, cyano, alkyl of 1 to 10 carbons or alkoxy of 1 to 10 carbons; Y is hydrogen; Z is a single bond, —COO— or —OCO—; and n is an integer of 1 to 10.

5. The composition according to claim 1, wherein in Formula (1), R is hydrogen; L is hydrogen; A is 1,4-phenylene, 2-methyl-1,4-phenylene, 9-methylfluorene-2,7-diyl or 9,9-dimethylfluorene-2,7-diyl; Z is —COO—, —OCO—, —CH=CHCOO— or —OCOCH=CH—; and n is an integer of 1 to 10; and wherein in Formula (2), L is hydrogen; A is 1,4-phenylene, 2-fluoro-1,4-phenylene, 2-methyl-1,4-phenylene or 2,3-bis(trifluoromethyl)-1,4-phenylene; Z is —COO—, —OCO—, —CH=CHCOO— or —OCOCH=CH—; and n is an integer of 1 to 10; and wherein in Formula (3), R is hydrogen; L is hydrogen; X is cyano; Y is hydrogen; Z is a single bond or —COO—; and n is an integer of 1 to 10.

6. The composition according to claim 5, wherein a ratio of the first component is 40 to 80% by weight, a ratio of the second component is 10 to 30% by weight, and a ratio of the third component is 10 to 30% by weight, each of which is based on the whole weight of the first component, the second component and the third component.

7. The composition according to claim 1, wherein a ratio of the first component is 40 to 80% by weight, a ratio of the second component is 10 to 30% by weight, and a ratio of the third component is 10 to 30% by weight, each of which is based on the whole weight of the first component, the second component and the third component.

8. The composition according to claim 7, further comprising a compound represented by Formula (4) as a fourth component:

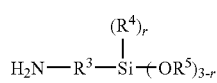

in Formula (4), R$^3$ is linear alkylene having a carbon number of 2 to 8; R$^5$ is methyl or ethyl; and r is 0.

9. The composition according to claim 1, further comprising a compound represented by Formula (4) as a fourth component:

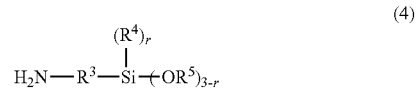

in Formula (4), R$^3$ is straight-chain alkylene of 2 to 10 carbons, and in this alkylene, one or two —CH$_2$— which are not adjacent to each other may be replaced by —O— or —NH—; R$^4$ is methyl, ethyl, propyl or isopropyl; R$^5$ is methyl, ethyl or trimethylsilyl; and r is 0, 1 or 2.

10. The composition according to claim 1, further comprising a compound represented by Formula (4) as a fourth component:

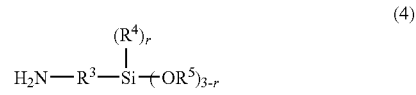

in Formula (4), R$^3$ is straight-chain alkylene of 2 to 8 carbons, and in this alkylene, one —CH$_2$— may be replaced by —NH—; R$^5$ is methyl or ethyl; and r is 0.

11. The composition according to claim 1, further comprising a compound represented by Formula (4) as a fourth component:

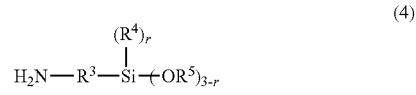

in Formula (4), R$^3$ is linear alkylene having a carbon number of 2 to 6; R$^5$ is methyl or ethyl; and r is 0.

12. A polymer obtained from the composition according to claim 1.

13. A phase difference plate or a polarizing plate having the polymer according to claim 12.

14. A liquid crystal display device having the phase difference plate or the polarizing plate according to claim 13.

15. The polymer obtained by coating the composition according to claim 1 on a film of triacetyl cellulose treated with saponification or a supporting plate of glass and then by polymerizing the composition.

16. A composition comprising a compound represented by Formula (1a) as a first component, a compound represented by Formula (2a) as a second component and a compound represented by Formula (3a) as a third component; and a ratio of the first component is 40 to 80% by weight, a ratio of the second component is 10 to 30% by weight and a ratio of the third component is 10 to 30% by weight, each of which is based on the whole weight of the first component, the second component and the third component:

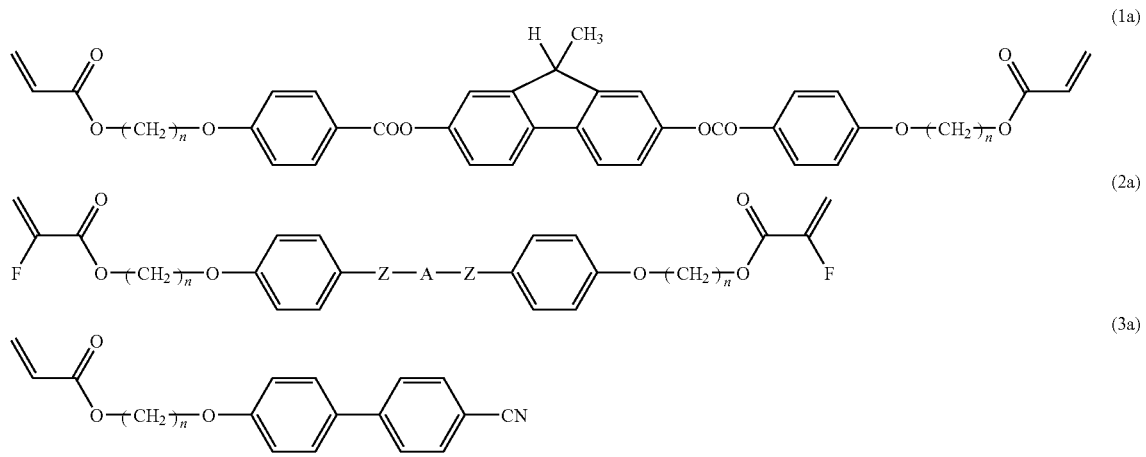

in the above formulas, A is 2-methyl-1,4-phenylene or 2,3-bis(trifluoromethyl)-1,4-phenylene; Z is —COO— or —OCO—; and n is an integer of 1 to 10.

17. The composition according to claim 16, further comprising a compound represented by Formula (α-1) as a fourth component:

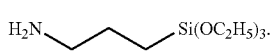

18. The polymer obtained from the composition according to claim 16.

19. An optical compensation film comprised by the polymer according to claim 18.

20. The polymer obtained by coating the composition according to claim 16 on a film of triacetyl cellulose treated with saponification or a supporting plate of glass and then by polymerizing the composition.

* * * * *